(12) United States Patent
Suemitsu et al.

(10) Patent No.: US 8,006,999 B2
(45) Date of Patent: Aug. 30, 2011

(54) HEAD PROTECTION AIRBAG

(75) Inventors: Taizo Suemitsu, Aichi-ken (JP); Yasuo Ochiai, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 30 days.

(21) Appl. No.: 12/585,678

(22) Filed: Sep. 22, 2009

(65) Prior Publication Data
US 2010/0084841 A1    Apr. 8, 2010

(30) Foreign Application Priority Data
Oct. 3, 2008   (JP) .................................. 2008-258800

(51) Int. Cl.
*B60R 21/213*  (2011.01)
*B60R 21/217*  (2011.01)

(52) U.S. Cl. .................... 280/730.2; 280/728.2; 280/742

(58) Field of Classification Search ............... 280/728.2, 280/730.2, 740, 742; *B60R 21/213, 21/217*
See application file for complete search history.

(56) References Cited

U.S. PATENT DOCUMENTS

| | | | | |
|---|---|---|---|---|
| 6,601,871 B2 * | 8/2003 | Fischer | ........................ | 280/730.2 |
| 6,695,342 B2 * | 2/2004 | Tanase et al. | ............... | 280/730.2 |
| 6,705,636 B2 * | 3/2004 | Takahara | .................... | 280/728.2 |
| 6,811,184 B2 * | 11/2004 | Ikeda et al. | .................... | 280/742 |
| 6,860,506 B2 * | 3/2005 | Ogata et al. | ................. | 280/730.2 |
| 6,866,293 B2 * | 3/2005 | Ogata | ......................... | 280/730.2 |
| 6,945,556 B2 * | 9/2005 | Maertens | ....................... | 280/729 |
| 7,077,425 B2 * | 7/2006 | Ogawa et al. | ............... | 280/730.2 |
| 7,080,853 B2 * | 7/2006 | Ogata | ......................... | 280/730.2 |
| 7,264,267 B2 * | 9/2007 | Kino et al. | ................... | 280/728.2 |
| 7,404,572 B2 * | 7/2008 | Salmo et al. | .................... | 280/729 |
| 7,597,348 B2 * | 10/2009 | Fukuda et al. | ............. | 280/730.2 |
| 7,731,227 B2 * | 6/2010 | Hotta et al. | ................ | 280/730.2 |
| 7,789,418 B2 * | 9/2010 | Wipasuramonton et al. | ......................... | 280/730.2 |
| 2004/0104563 A1 * | 6/2004 | Fischer | ....................... | 280/743.1 |
| 2006/0108778 A1 * | 5/2006 | Ochiai et al. | ................ | 280/730.2 |
| 2008/0079243 A1 * | 4/2008 | Kino et al. | ................... | 280/728.2 |

FOREIGN PATENT DOCUMENTS

JP   2007008277 A  *  1/2007
JP   A-2008-087519    4/2008

* cited by examiner

*Primary Examiner* — Paul N Dickson
*Assistant Examiner* — Laura Freedman
(74) *Attorney, Agent, or Firm* — Posz Law Group, PLC

(57) ABSTRACT

A head protection airbag according to the invention includes: a shielding main body portion which is manufactured by double weaving, is configured to have a substantially rectangular plate shape when the shielding main body portion is flatly deployed so that a vehicle inside-facing wall and a vehicle outside-facing wall overlap with each other, and covers a window on the inside when the inflation is completed; a plurality of mounting portions which protrude upward from an upper edge of the shielding main body portion and mount the upper edge of the shielding main body portion on an upper edge of the window; and a connection port which has a substantially tubular shape, protrudes upward from the upper edge of the shielding main body portion and allows an inflow of inflation gas into the shielding main body portion. The mounting portions and the connection port are separate from the double-woven shielding main body portion and are connected to the shielding main body portion.

16 Claims, 16 Drawing Sheets

Fig. 14A
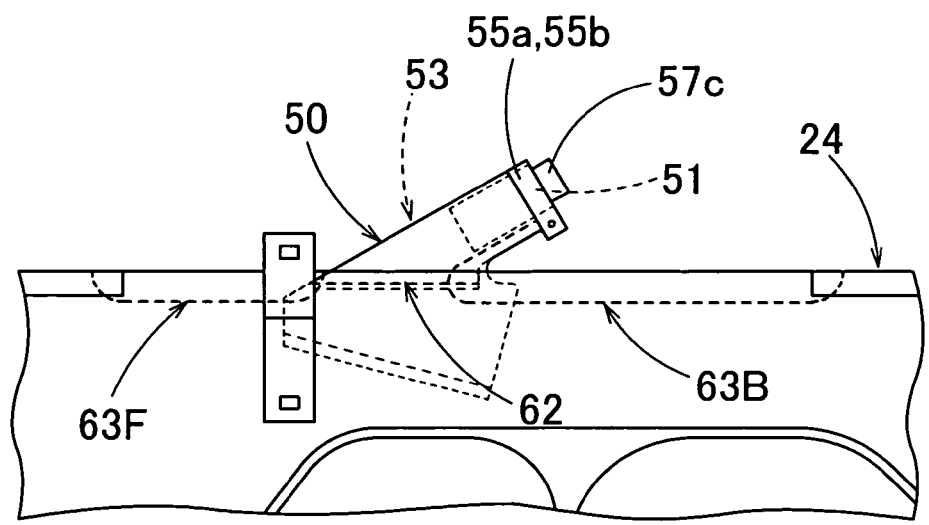
Fig. 14B
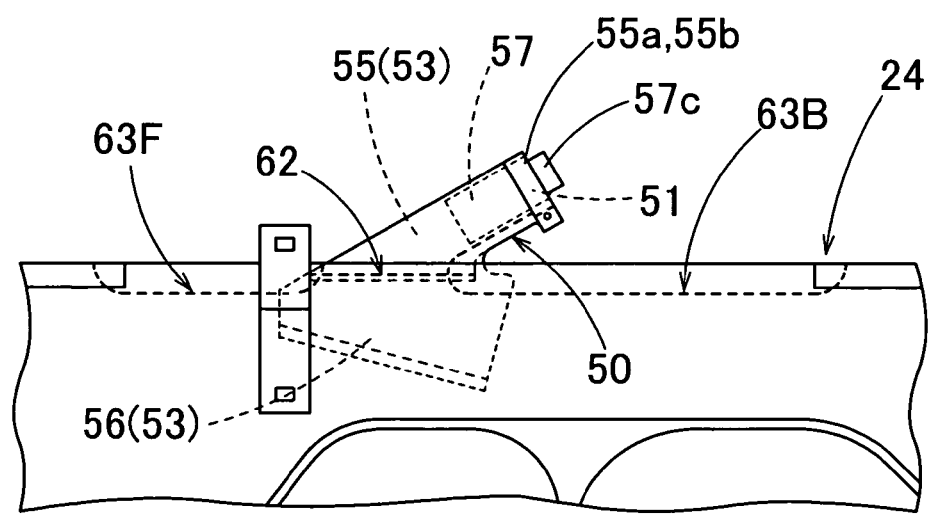

HEAD PROTECTION AIRBAG

The present application claims priority from Japanese Patent Application No. 2008-258800 of Suemitsu et al., filed on Oct. 3, 2008, the disclosure of which is hereby incorporated into the present application by reference.

BACKGROUND OF THE INVENTION

1. Field of the Invention

The present invention relates to a head protection airbag which is configured to be folded and stored at an upper edge of a window on the inside of a vehicle, the airbag is mounted and fixed to the body of the vehicle at the upper edge side, so that the airbag protrudes downward from where it is stored, due to an inflow of inflation gas from an inflator, deploying while inflating so as to cover the inside of the window.

2. Description of the Related Art

In general, as shown in JP-A-2008-87519, head protection airbags are formed so that, at the upper edge of a shielding main body portion covering the inside of a window when the inflation is completed, a mounting portion for mounting the airbag on the upper edge of the window or a substantially tubular connection port which is connected to an inflator and allows an inflow of inflation gas to the inside of the shielding main body portion are formed so that one protrudes from the shielding main body portion. In the conventional head protection airbags, the mounting portion or the connection port is formed integrally with the shielding main body portion by double weaving.

In general, the airbags manufactured by double weaving are formed by cutting a sheet-like airbag material in which an inflation portion which is inflated by an inflow of inflation gas between a vehicle inside-facing wall and a vehicle outside-facing wall, and a non-inflation portion which is configured to couple the vehicle inside-facing wall to the vehicle outside-facing wall but to have no inflow of inflation gas inside it are woven in a predetermined shape. Accordingly, when the mounting portion or the connection port are formed integrally with the shielding main body portion by double weaving, the upper and lower width dimensions of the airbag material necessary for the manufacturing of airbags are required to be larger by an amount equal to the protrusion of the mounting portion or the connection port. Further, in the conventional airbags, there is room for improvement from the viewpoint of enhancing the airbag material yield. This is because the mounting portion or the connection port is disposed partially along the front-back direction and the material around the mounting portion or the connection port is unused.

SUMMARY OF THE INVENTION

An object of the invention is to provide a head protection airbag which can be manufactured at a low cost with good yield.

The object of the invention can be achieved with a head protection airbag having the following configuration.

A head protection airbag, which is configured to be folded and stored at the upper edge of a window on the inside of a vehicle, the upper edge side of the airbag being mounted and fixed to the body of the vehicle, so as to protrude downward from where it is stored due to an inflow of inflation gas from an inflator, and to be deployed and inflated so as to cover the window on the inside, includes: a shielding main body portion which is configured to cover the window on the inside when the inflation is completed; a plurality of mounting portions which protrude upward from the upper edge of the shielding main body portion and mount the upper edge of the shielding main body portion on the upper edge of the window; and a connection port which has a substantially tubular shape, protrudes upward from the upper edge of the shielding main body portion, and has an insertion opening for connection to the inflator at the upper end so as to allow the inflow of inflation gas to an inflation portion of the shielding main body portion. The shielding main body portion has an inflation portion, which is inflated by the inflow of inflation gas between a vehicle inside-facing wall and a vehicle outside-facing wall, and a non-inflation portion into which there is no inflow of inflation gas. The shielding main body portion is manufactured by double weaving and a shape, when the shielding main body portion is flatly deployed so that the vehicle inside-facing wall and the vehicle outside-facing wall overlap with each other, is a substantially rectangular plate shape. The mounting portions and the connection port are connected to the shielding main body portion but are separate from the double-woven shielding main body portion.

In the head protection airbag according to the invention, only the shielding main body portion, the shape of which is a substantially rectangular plate shape when the shielding main body portion is flatly deployed so that the vehicle inside-facing wall and the vehicle outside-facing wall overlap with each other, is formed by double weaving, and the mounting portions and the connection port which are formed so as to protrude upward from the upper edge of the shielding main body portion are separate from the shielding main body portion. That is, only the substantially rectangular shielding main body portion with no partial protruding part is formed by cutting the airbag material formed of a long sheet member. Accordingly, when the airbag is manufactured, the amount of unused airbag material can be reduced and the yield of the airbag material can be enhanced.

Accordingly, regarding the head protection airbag according to the invention, the yield is enhanced and the manufacturing is thus performed at a low cost.

In the head protection airbag according to the invention, it is preferable that a connection port material is a coated cloth having a coating layer on one side thereof, and the connection port is formed so that the coating layer is disposed on the inner side of the port. This is because then it is possible to improve the heat resistance and the durability of the connection port in which high-temperature inflation gas discharged from the inflator flows.

In the head protection airbag according to the invention, it is preferable that the upper edge of the shielding main body portion have an opening for connection to the connection port, and the connection port is connected to the shielding main body portion by turning the lower end of the connection port which communicates with the shielding main body portion so that it is pointing upward, and sewing this lower end to the peripheral edge of the opening.

In the head protection airbag having the above-described configuration, the edge portion at the lower end of the connection port can be connected to the shielding main body portion by reversing the front and back of the connection port, disposing the connection port so that the edge portion at its lower end is turned upward and matched with the edge portion of the opening, sewing the edge portion of the connection port to the peripheral edge of the opening of the shielding main body portion, and re-reversing the connection port. Accordingly, the operation of sewing the edge portion at the lower end of the connection port to the peripheral edge of the opening is easily performed and the number of manufacturing processes of the airbag can be reduced.

In the head protection airbag having the above-described configuration, when the connection port material constituting the connection port is formed by being cut out from the region of the non-inflation portion in the shielding main body portion, the separate connection port material can be concurrently manufactured with the shielding main body portion. So, this is preferable to the case in which the connection port material is formed from a separate base material because manufacturing costs can then be reduced.

In the head protection airbag having such a configuration, it is preferable that the outer surface of the shielding main body portion is covered with a coating layer which is formed by applying a coating agent for preventing gas leakage, and the connection port material is made into the connection port so that the coating layer is disposed on the inner side of the port.

In the head protection airbag having the above-described configuration, it is possible to improve the heat resistance and the durability of the connection port in which the high-temperature inflation gas discharged from the inflator flows.

In the head protection airbag having the above-described configuration, it is preferable that in the non-inflation portion, an opening, which is formed by cutting out the connection port material, is blocked by a separate blocking member. In the head protection airbag, when the inflation of the airbag is completed, the inside of the whole window can be covered even in the region of the non-inflation portion separate from the protection area where the head of a vehicle occupant is protected. Accordingly, even when the head of the vehicle occupant hits the region of the non-inflation portion, it is possible to prevent the head of the vehicle occupant from being brought into contact with the window. In this case, the blocking member for blocking the opening can be made of uncoated cloth in an airbag having a configuration in which the shielding main body portion is double-woven and the coating layer is then provided on the outer circumferential side thereof. In this case, the manufacturing cost of the airbag can be further reduced and the weight of the airbag itself can be reduced.

In the head protection airbag according to the invention, it is preferable that the mounting portion is configured to include a mounting main body and a belt-like wrapping portion extending downward from the lower end of the mounting main body, and the lower end of the mounting main body is coupled to the upper edge of the shielding main body portion, and it is preferable that the wrapping portion includes a connection piece disposed at its end away from the mounting main body and is fastened together with the mounting main body by a mounting bracket for mounting the mounting main body on the upper edge of the window, and a cutaway portion, which can be ruptured when the airbag is deployed and inflated, and is wound around the outer circumference of the folded shielding main body portion so as to prevent collapsing when the airbag is folded so as to be stored.

In the head protection airbag having the above-described configuration, the wrapping portion for preventing collapsing when the airbag is folded and stored is formed to be integral with the mounting portion. While being wound around the folded shielding main body portion, the wrapping portion prevents collapsing of the folded shielding main body portion when the connection piece provided at the end of the wrapping portion is fastened together with the mounting main body by using the mounting bracket for mounting the mounting main body on the upper edge of the window. Accordingly, in the head protection airbag having the above-described configuration, when the mounting bracket is mounted on the mounting main body, the wrapping portion for preventing collapsing of the airbag can be concurrently disposed around the airbag. As a result, by not providing a separate wrapping member, it is possible to reduce the number of manufacturing processes and costs.

In the head protection airbag having the above-described configuration, it is preferable that, when the airbag is installed in a vehicle, the rupture portion is positioned below the folded shielding main body portion. In the head protection airbag having such a configuration, when the airbag begins to inflate and the folded shielding main body portion protrudes downward so as to unfold, the rupture portion can be rapidly ruptured and the airbag can thus be rapidly deployed.

In the head protection airbag having the above-described configuration, it is preferable that an inner tube is disposed in the connection port so as to cover an area from the connection port to the area below the connection port in the shielding main body portion. This is because it is thereby possible to protect the connection port and the part near the connection port in the shielding main body portion, and to further improve the heat resistance and the durability of the connection port.

It is preferable that the head protection airbag according to the invention is manufactured with the following manufacturing method.

The method includes: cutting an airbag material, which is woven so that shielding main body portions are cut out continuously in series side by side, to produce a shielding main body portion that has a part of its upper edge opened; coupling the mounting portions to the upper edge of the shielding main body portion; inserting a connection port material, which forms the connection port, into the shielding main body portion at its opening turned so that the upper end constituting the insertion opening is positioned on the lower side, and sewing the lower edge thereof to the peripheral edge of the opening in the shielding main body portion by using suture threads; and making the connection port material protrude from the shielding main body portion so as to be released from the up-side-down state, mutually coupling edge portions of the front-back sides, and mutually coupling the remaining opening part of the shielding main body portion, thereby forming the connection port and connecting the connection port to the shielding main body portion.

In the head protection airbag manufacturing method having the above-described configuration, the shielding main body portion material can be manufactured when the airbag material is cut in straight lines. Accordingly, the airbag can be produced with an enhanced yield. In addition, in the head protection airbag manufacturing method having the above-described configuration, the airbag does not have to have a shape with a partial protrusion cut from the airbag material as with conventional head protection airbags in which the connection port is integrally disposed, and the shielding main body portion material can be manufactured with a straight line cutting. Thus, laser cutting is not required, and the cutting can thus be performed by a cold cutter. As a result, initial manufacturing costs can be reduced and the number of manufacturing processes can also be reduced when the airbag is manufactured as described above.

BRIEF DESCRIPTION OF THE DRAWINGS

FIGS. 14A to 14B are schematic diagrams explaining a process for forming a stopper at the upper end of the connection port in the manufacturing process of the head protection airbag according to the embodiment.

DESCRIPTION OF THE PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Figure 1:
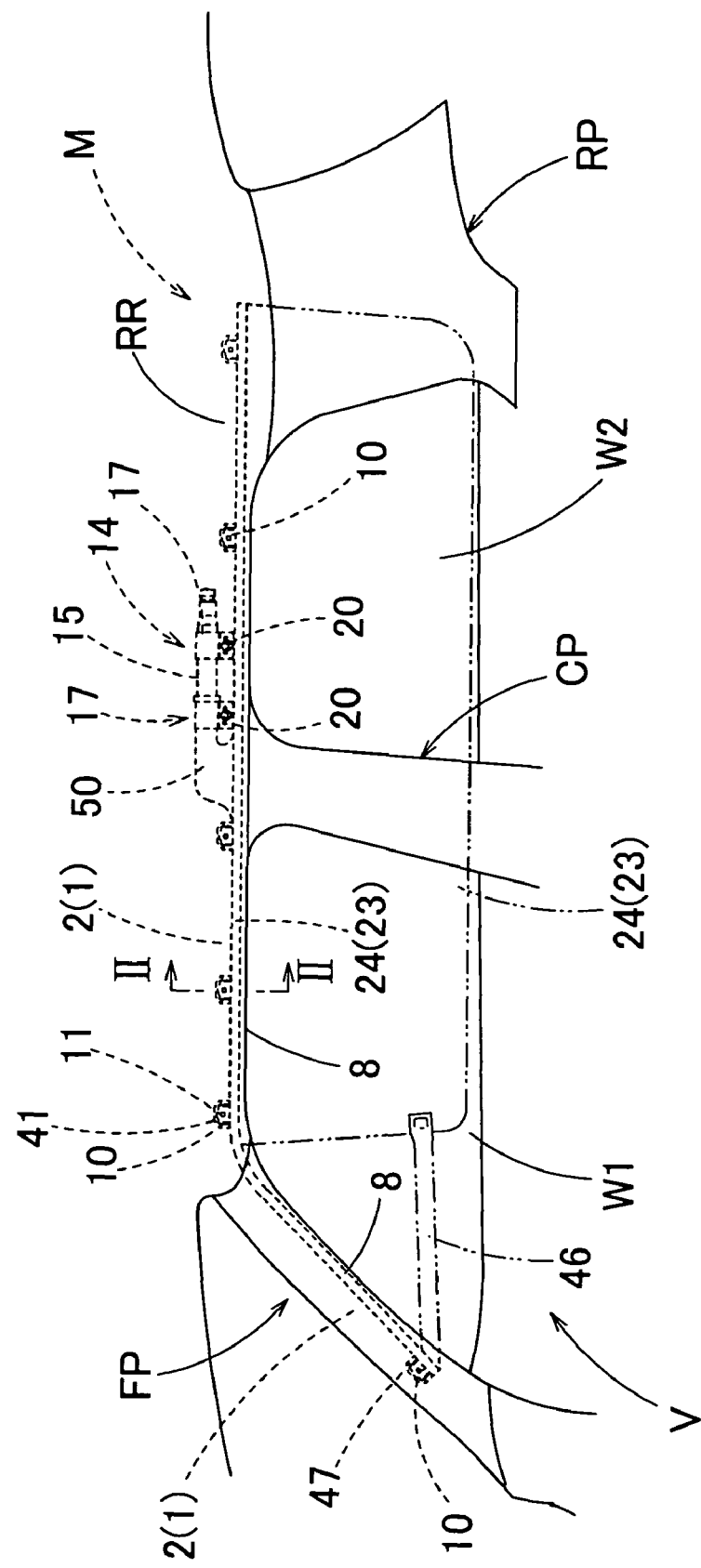
FIG. 1 is a schematic front view showing a state in which a head protection airbag device using a head protection airbag according to an embodiment of the invention is installed in a vehicle.
Figure 2:
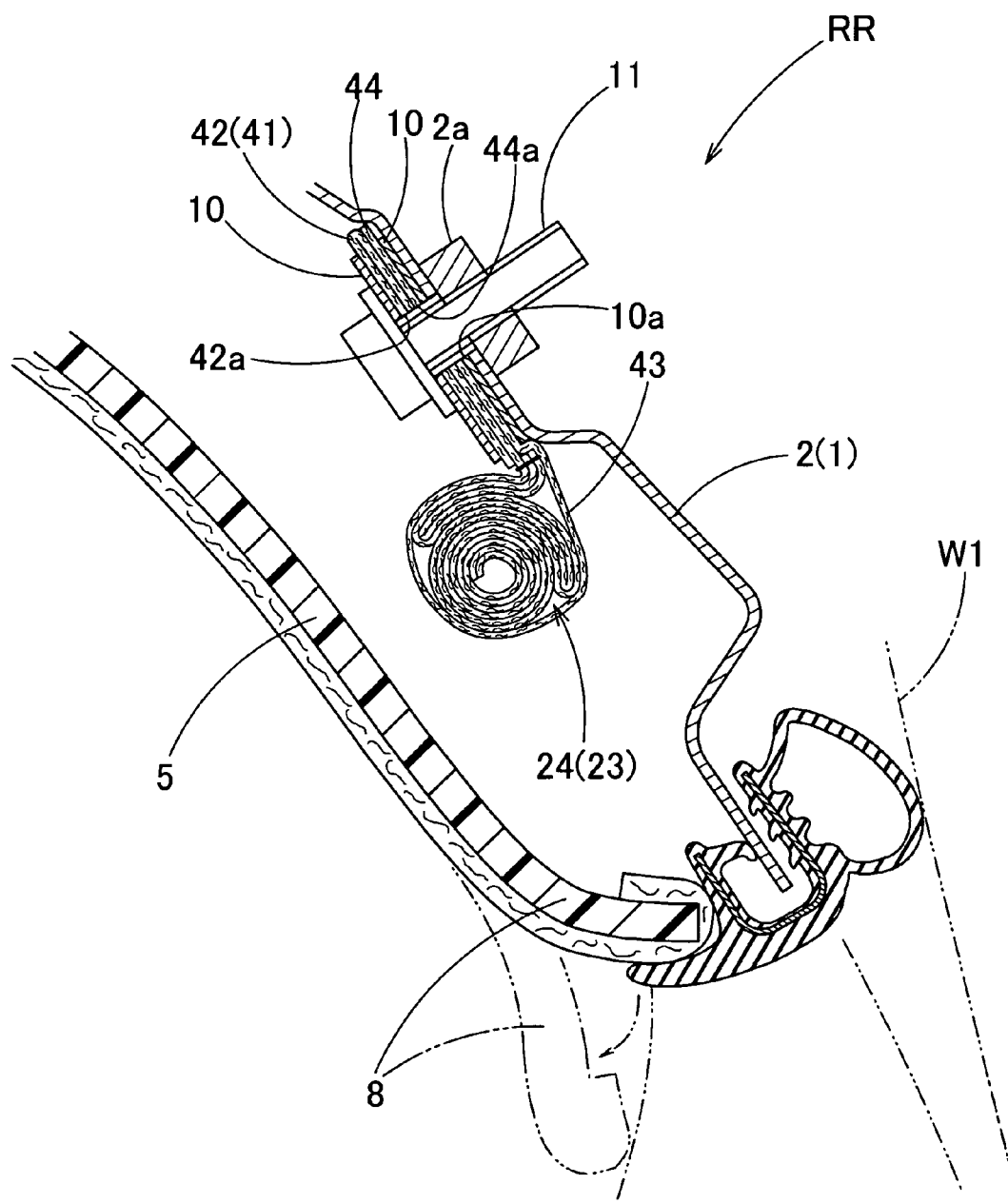
FIG. 2 is a schematic cross-sectional view taken along the line II-II of FIG. 1.
Figure 3:
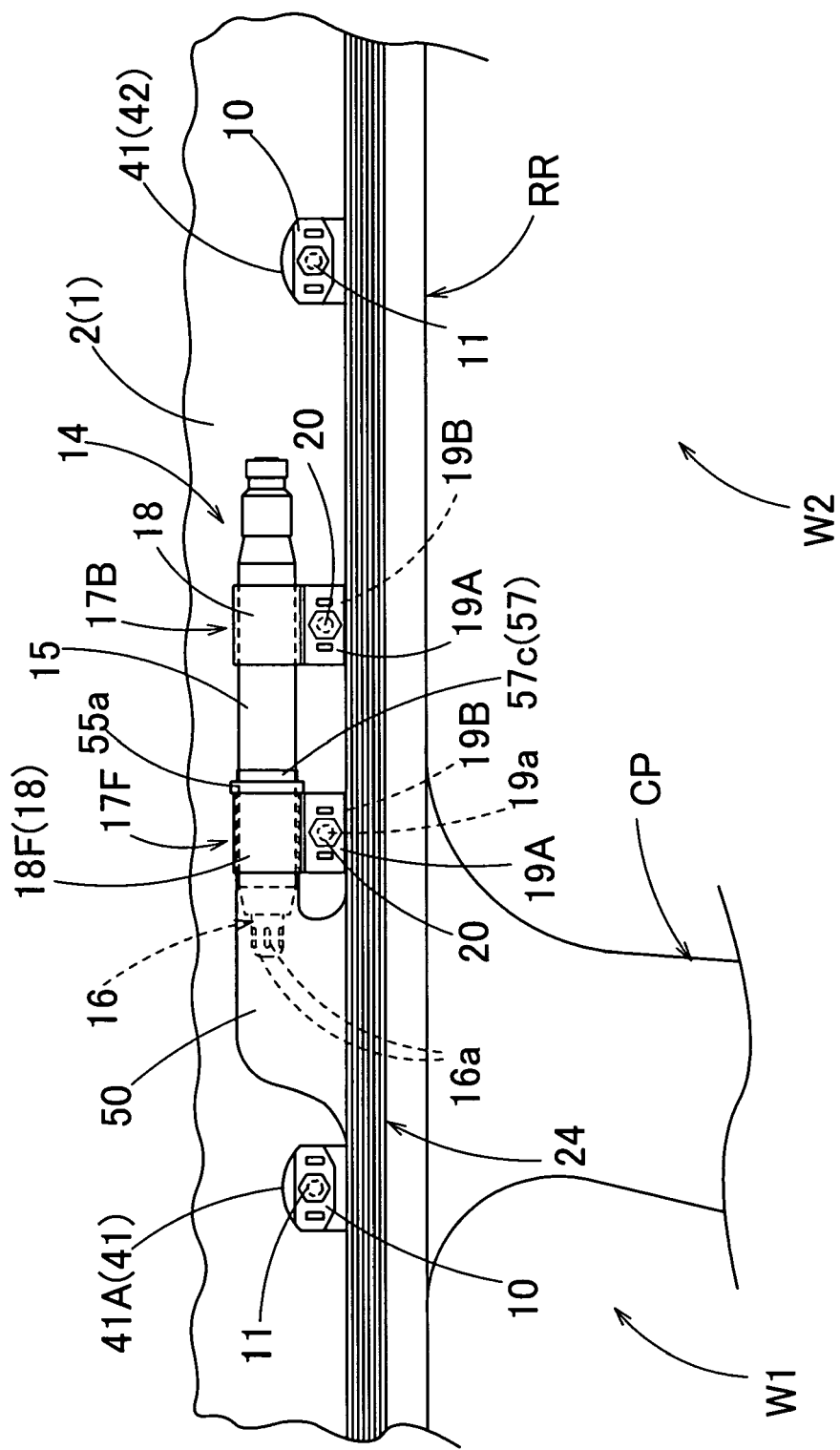
FIG. 3 is a partial enlarged front view showing the vicinity above a center pillar portion in the head protection airbag device according to the embodiment, in which a roof head lining is omitted.

Hereinafter, an embodiment of the invention will be described on the basis of the drawings. As shown in FIG. 1, a head protection airbag 23 (hereinafter, abbreviated to "airbag" if not otherwise indicated) according to the embodiment is used in a head protection airbag device M installed in a vehicle V. As shown in FIGS. 1 to 3, the airbag device M includes the airbag 23, an inflator 14, mounting brackets 10 and 17 and an airbag cover 8. In this embodiment, the airbag 23 is folded to be stored at the upper edges of windows W1 and W2 of the vehicle V, extending from the lower portion of a front pillar portion FP to the portion above a rear pillar portion RP, and passing along the lower edge of a roof side rail portion RR. The airbag 23 is deployed and inflated downward from the upper edges of the windows W1 and W2 so as to cover the inside of the windows W1 and W2 when there is an inflow of inflation gas.

The airbag cover 8 is formed from the lower edges of a front pillar garnish 4 disposed in the front pillar portion FP and a roof head lining 5 disposed in the roof side rail portion RR. The front pillar garnish 4 and the roof head lining 5 are made of a synthetic resin, and are respectively mounted and fixed to the inside of an inner panel 2 adjacent to the body 1 in the front pillar portion FP and the roof side rail RR. The roof head lining 5 is disposed from the vicinity above the front pillar portion FP to the vicinity above the rear pillar portion RP, passing over the center pillar portion CP.

As shown in FIGS. 1 and 3, the inflator 14 is a cylinder type having a substantially cylindrical shape. The inflator 14 is inserted into a connection port 50 to allow the inflow of inflation gas to the airbag 23 and is connected to the airbag 23 by using tubular holding portions 18 of the mounting brackets 17 for mounting the inflator 14 on the inner panel 2 of the body 1. Specifically, the inflator 14 includes a main body 15 which has a substantially cylindrical shape and a small diameter portion 16 which is disposed at the tip end (in this embodiment, front end) of the main body 15 and has a diameter smaller than that of the main body 15. In the small diameter portion 16, a plurality of gas discharge ports 16a are formed in directions radial to the axis. The inflator 14 is inserted into the connection port 50 of the airbag 23, starting with the small diameter portion 16 thereof. The mounting bracket 17 for mounting the inflator 14 on the inner panel 2 includes the tubular holding portion 18, in which a belt-like member is substantially tubularly curved, and two mounting plate portions 19A and 19B, which are formed at opposite ends of the tubular holding portion 18 and have a substantially rectangular plate shape. The tubular holding portion 18 is disposed around the main body 15 of the inflator 14. The two mounting brackets 17 are disposed near the front and rear ends of the main body 15 of the inflator 14 which are two places in the axial direction of the inflator 14 (see FIG. 3).

A mounting bracket 17F which is disposed at the front side also fastens the connection port 50, to be described later, of the airbag 23. Specifically, the mounting bracket 17F is disposed near an insertion opening 51 of the connection port 50, which is near the small diameter portion 16 of the inflator 14. In greater detail, the mounting bracket 17F is positioned in front of a stopper 55b to be described later. In each of the mounting plate portions 19A and 19B, a through hole 19a is formed through which a mounting bolt 20 can be inserted. The mounting bolt 20 is a member for fixing the mounting bracket 17 to the inner panel 2 of the body 1. In each mounting bracket 17, the tubular holding portion 18 is disposed at the outer circumferential side of the main body 15 of the inflator 14 so that the holding plate portions 19A and 19B overlap with each other in a vehicle inward/outward direction. In the mounting bracket 17F which is disposed at the front, a tubular holding portion 18F is disposed around the outer circumference of the main body 15 of the inflator 14, sandwiching the connection port 50 of the airbag 23. When the holding plate portion 19B disposed toward the outside of the vehicle is brought into contact with the inner panel 2, and the mounting bolt 20 which is inserted into the through hole 19a is engaged with a nut (not shown) provided in the inner panel 2 in a state in which the tubular holding portion 18 is mounted around the connection port 50, the inflator 14 can be mounted on the inner panel 2. At this time, the tubular holding portion 18 is fastened so that it constricts both the main body 15 of the inflator 14 and the connection port 50 of the airbag 23 so that the two are connected to each other.

Mounting brackets 10 for mounting portions 41 of the airbag 23 on the inner panel 2 of the body 1 comprise a metal sheet having a substantially rectangular plate shape. Each mounting bracket 10 is composed of two sheet members sandwiching the mounting portion 41 from the inside and from the outside of the vehicle (see FIG. 2). In this embodiment, the mounting bracket 10 is configured to sandwich a mounting main body 42 and a connection piece 44 of the mounting portion 41 from the inside and outside of the vehicle. In addition, in the mounting bracket 10, an insertion hole 10*a* is formed for inserting a mounting bolt 11 therethrough. By engaging the holding bolt 11 with a nut 2*a* provided in the inner panel 2 via the insertion hole 10*a* and insertion holes 42*a* and 44*a* of the mounting portion 41 (mounting main body 42 and connection piece 44), the mounting bracket 10 is mounted and fixed to the inner panel 2 in a state in which the mounting portion 41 (mounting main body 42 and connection piece 44) is sandwiched (see FIG. 2).

Figure 4:
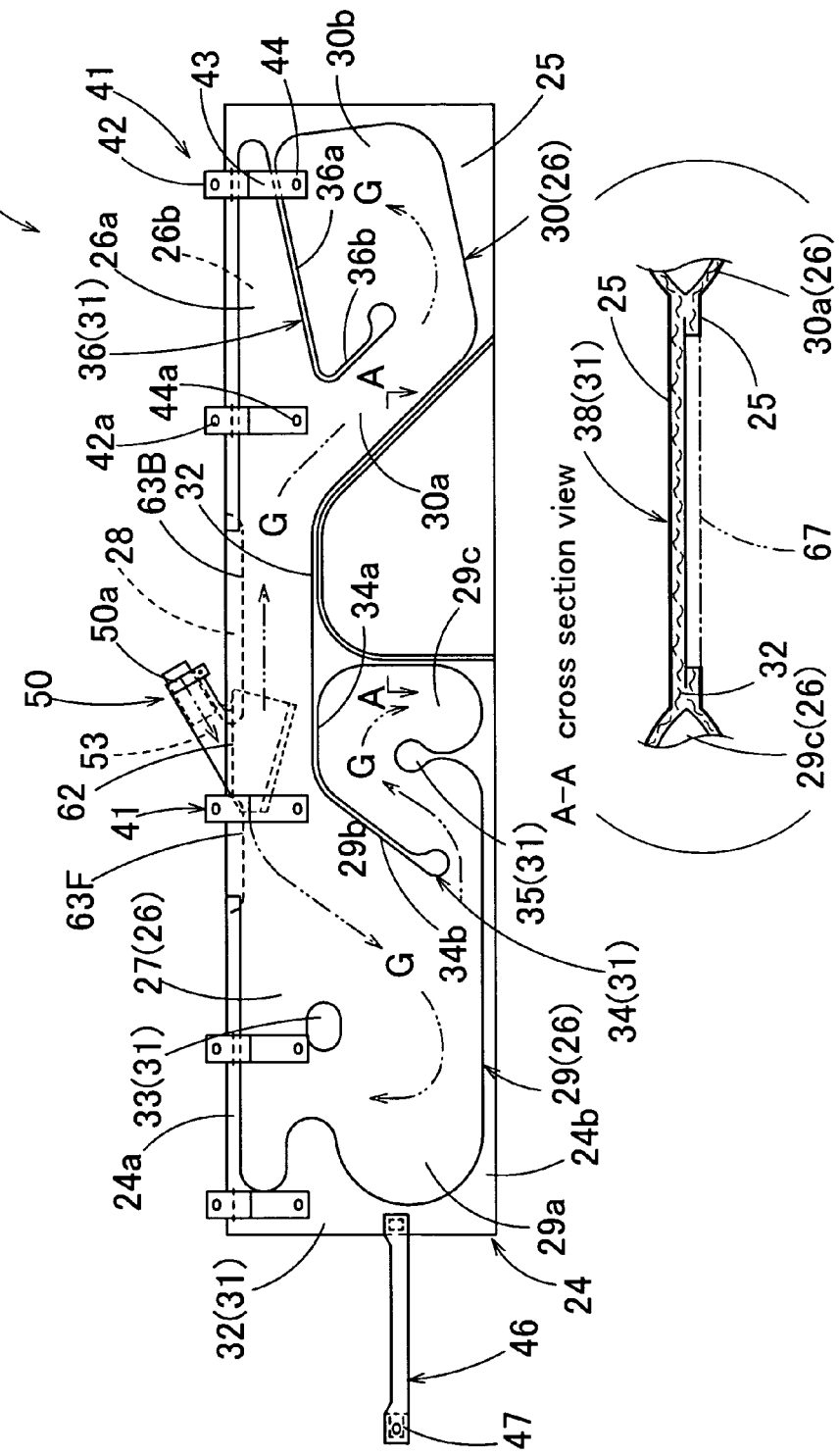
FIG. 4 is a front view of a state in which the head protection airbag according to the embodiment is flatly deployed.

The airbag 23 is configured to be deployed from its folded state by the inflow of inflation gas G from the inflator 14. As shown by the two-dot chain line of FIG. 1, when it has completed its inflation, the airbag 23 is configured to cover the insides of the windows W1 and W2, a center pillar garnish 7 which is disposed at the inside of the center pillar portion CP and a rear pillar garnish 6 which is disposed at the inside of the rear pillar portion RP. In this embodiment, as shown in FIG. 4, the airbag 23 includes a shielding main body portion 24 which covers the insides of the windows W1 and W2 when inflation is completed, a plurality of mounting portions 41 which protrude upward from the upper edge 24*a* of the shielding main body portion 24, and a substantially tubular connection port 50 which protrudes upward from the upper edge 24*a* of the shielding main body portion 24. Each mounting portion 41 is a part for mounting the upper edge 24*a* of the shielding main body portion 24 on the upper edge of the window W1 or W2. Further, the airbag 23 also includes a mounting belt 46 extending forward from the vicinity of the lower end at the front edge of the shielding main body portion 24.

The shielding main body portion 24 has an inflation portion 26, which is inflated by an inflow of inflation gas between a vehicle inside-facing wall 26*a* and a vehicle outside-facing wall 26*b*, and a non-inflation portion 31, to which there is no inflow of inflation gas, and is manufactured by double weaving. The shape when the shielding main body portion 24 is flatly deployed so that the vehicle inside-facing wall 26*a* and the vehicle outside-facing wall 26*b* of the inflation portion 26 overlap with each other is substantially rectangular (see FIG. 8). Moreover, the shielding main body portion 24 is configured so that its inflation-completed shape is a substantially rectangular plate shape capable of covering the insides of the windows W1 and W2, the center pillar garnish 7 and the rear pillar garnish 6. In this embodiment, the shielding main body portion 24 is manufactured by double weaving using polyamide yarns or the like. The outer surface (outer circumferential surface) of the shielding main body portion 24, is covered with a coating layer 25 which is formed by applying a coating agent comprising silicon and the like, for preventing gas leakage, over substantially the whole area, excluding the area of a plate-like portion 38 to be described later (see FIGS. 4 and 7).

In this embodiment, the inflation portion 26 includes a gas supply path portion 27, an front seat inflation portion 29 and an rear seat inflation portion 30.

As shown in FIG. 4, the gas supply path portion 27 extends in the front-back direction of the vehicle along the upper edge 24*a* of the shielding main body portion 24. Specifically, the gas supply path portion 27 is disposed over substantially the whole front and rear areas of the shielding main body portion 24. The gas supply path portion 27 is configured to allow an inflow of the inflation gas G discharged from the inflator 14 to the inside of the shielding main body portion 24 via the connection port 50 and to introduce the inflation gas to the front seat inflation portion 29 and the rear seat inflation portion 30 disposed below the gas supply path portion 27. The connection port 50 which is a part separate from the shielding main body portion 24 is sewn (connected) to a position slightly in front of the center in the front-back direction of the gas supply path portion 27, specifically to the position at the upper edge above a vertical cell 29*c* of the front seat inflation portion 29. In this embodiment, an opening 28 (opening for connection) for connecting the connection port 50 is formed at the upper edge of the gas supply path portion 27 (see FIGS. 4 and 11).

Actually, as shown in FIG. 11, the opening 28 is opened by separating the vehicle inside-facing wall 26*a* and the vehicle outside-facing wall 26*b* in a shielding main body portion material 66 which is formed by cutting an airbag material 65 to be described later. In the manufactured airbag 23, the opening 28 is blocked by sutured parts 63F and 63B where the vehicle inside-facing wall 26*a* and the vehicle outside-facing wall 26*b* are sewed to each other (see FIG. 4). The opening 28 is formed so that its opening width dimension in the front-back direction is larger than the width dimension in the front-back direction of the lower end 50*b* of the connection port 50. This is because the sewing of the connection port 50 and insertion of an inner tube 53 to be described later are then made easier. Specifically, the opening 28 is formed from substantially the center in the front-back direction of the front seat inflation portion 29 to the vicinity of the front end of the rear seat inflation portion 30 at the upper edge of the gas supply path portion 27. The connection port 50 is connected to an area which is substantially the center in the front-back direction of the opening 28. Remaining portions 28*c* and 28*d*, which are positioned ahead and behind the part in which the connection port 50 is sewed in the opening 28, are blocked by sewing the vehicle inside-facing wall 26*a* and the vehicle outside-facing wall 26*b*, which overlap with each other, to each other by using suture threads.

Figure 5:
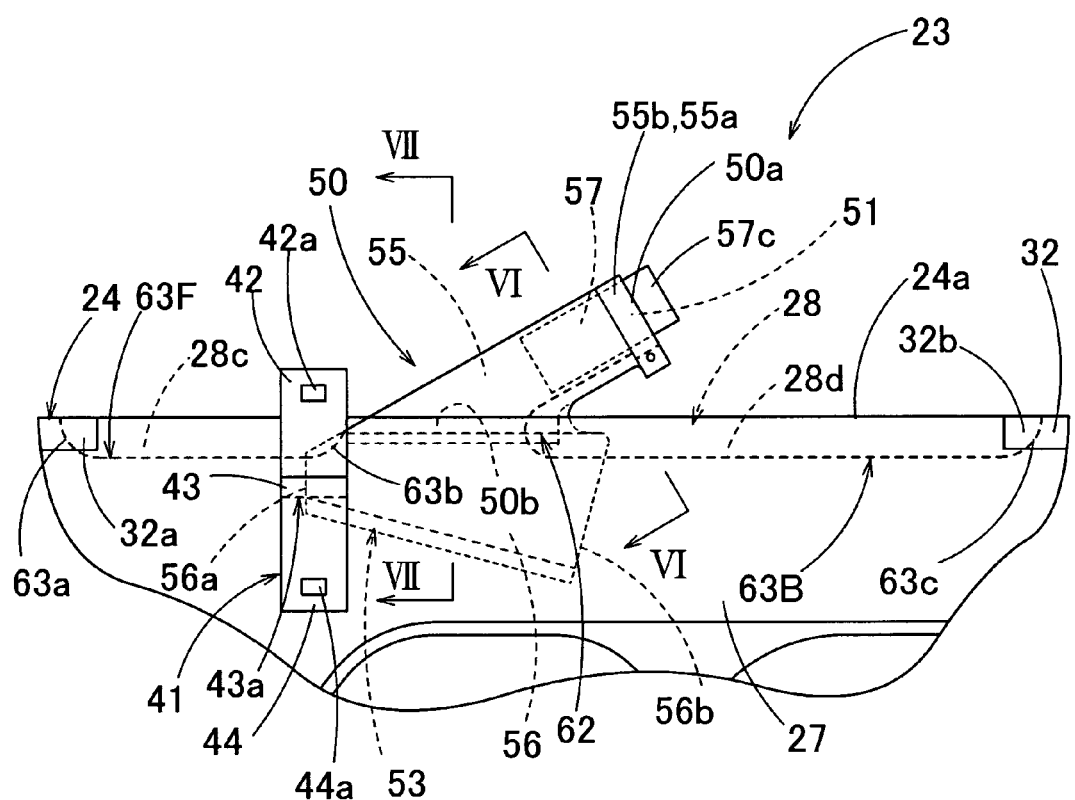
FIG. 5 is a partial enlarged front view showing the vicinity of a connection port in the airbag of FIG. 4.

In this embodiment, the suture parts 63F and 63B blocking the remaining portions 28*c* and 28*d* of the opening 28 extend in substantially the front-back direction at the upper edge 24*a* of the shielding main body portion 24, which is the peripheral edge of the opening 28, so as to continue the boundary line between the gas supply path portion 27 and a peripheral edge portion 32. Further, the ends of the suture parts 63F and 63B by the suture part 62 are curved upward so that these suture parts intersect with the suture part 62 used for sewing the connection port 50 to the peripheral edge of the opening 28. Specifically, the suture part 63F is curved with an end turned upward so that the end 63*b* by the suture part 62 intersects with the suture part 62. The suture part 63B is continuously formed over the edge at the rear of the connection port 50 as described later, and thus its curved part near where the suture part 63B intersect with the connection port 50 intersects with the suture part 62. In this embodiment, as shown in FIG. 5, the suture parts 63F and 63B are formed so as to be positioned slightly below the boundary line between the gas supply path portion 27 and the peripheral edge portion 32. In addition, regarding the suture parts 63F and 63B, so as not to form a gap with the peripheral edge portion 32 adjacent to the front side or the rear side, they are configured with the end portions 63a and 63b by the peripheral edge portion 32 which are curved with their end edges turned upward to intersect with end portions 32a and 32b of the peripheral edge portion 32 (see FIG. 5). In this embodiment, the suture part 63B behind the connection port 50 is continuously formed along the rear edge of the connection port 50 so as to sew the rear edge of the connection port 50.

The front seat inflation portion 29 is disposed so as to cover the inside of the window W1 and the center pillar portion CP when the inflation of the airbag 23 is completed. As shown in FIG. 4, in the area of the front seat inflation portion 29, a thickness regulation portion 33 and division portions 34 and 35 to be described later are disposed. In addition, in the front seat inflation portion 29, an inflation main portion 29a, which inflates into a substantially rectangular shape, and the vertical cells 29b and 29c are provided side by side in the front-back direction. The inflation main portion 29a is configured so that the substantially elliptical thickness regulation portion 33 is disposed near the upper edge of inflation main portion 29a and divides inflation main portion 29a from the gas supply path portion 27. The inflation main portion 29a communicates with the gas supply path portion 27 in the area other than the thickness regulation portion 33 and is configured to allow an inflow of the inflation gas G thereinto from its upper edge. The two vertical cells 29b and 29c disposed behind the inflation main portion 29a are divided from the gas supply path portion 27 and their upper ends are blocked by a crossbar portion 34a of the division portion 34 disposed along the front-back direction. The vertical cell 29b communicates with the inflation main portion 29a at its lower end. That is, the vertical cell 29b is configured to allow an inflow of the inflation gas G from its lower end after the gas passes through the inflation main portion 29a. The vertical cell 29c communicates with the vertical cell 29b at its upper end. That is, the vertical cell 29c is configured to allow an inflow of the inflation gas G from its upper end after the gas passes through the vertical cell 29b.

The rear seat inflation portion 30 is disposed so as to cover the inside of the rear half of the window W2 and the rear pillar portion RP when the inflation of the airbag 23 is completed. As shown in FIG. 4, in the area of the rear seat inflation portion 30, a division portion 36 to be described later is disposed. In addition, in the rear seat inflation portion 30, a vertical cell 30a which is disposed so as to be inclined with respect to the vertical direction so that its upper end is positioned toward the front and the lower end is positioned toward the rear, and an inflation main portion 30b which inflates into a substantially rectangular shape are provided side by side in the front-back direction. The vertical cell 30a communicates with the gas supply path portion 27 at its upper end and is configured to allow the inflow of the inflation gas G from its upper end. The inflation main portion 30b is divided from the gas supply path portion 27 and its upper end is blocked by a crossbar portion 36a of the division portion 36, crossbar portion 36a disposed along the front-back direction. The inflation main portion 30b communicates with the vertical cell 30a at its lower end. That is, the inflation main portion 30b is configured to allow the inflow of the inflation gas G thereinto from its lower end after the gas passes through the vertical cell 30a.

In this embodiment, the non-inflation portions 31 here are the peripheral edge portion 32, the thickness regulation portion 33, the division portions 34, 35 and 36, and the plate-like portion 38. In this embodiment, the non-inflation portions 31 are configured to couple the vehicle inside-facing wall 26a to the vehicle outside-facing wall 26b, except for the plate-like portion 38.

The peripheral edge portion 32 is formed so as to surround the inflation portion 26 in the shielding main body portion 24, over the whole circumference except for the area of the opening 28. The thickness regulation portion 33 is disposed in the area of the inflation main portion 29a of the front seat inflation portion 29 as described above. The shape of the thickness regulation portion 33 is a substantially elliptical, in which the long axis is substantially along the front-back direction. The division portion 34 is disposed in the area of the front seat inflation portion 29 and includes the crossbar portion 34a and a vertical bar portion 34b. The crossbar portion 34a extends forward from the front of the upper edge of the plate-like portion 38 to be described later, so as to divide the vertical cells 29b and 29c from the gas supply path portion 27. The vertical bar portion 34b extends diagonally downward from the front end of the crossbar portion 34a toward the front so as to divide the expansion main portion 29a and the vertical cell 29b. The division portion 35 is disposed in the area of the front seat inflation portion 29. The division portion 35 extends upward from a part of the lower edge 24b of the shielding main body portion 24 where there is the peripheral edge portion 32, so as to divide the vertical cells 29b and 29c. The division portion 36 is disposed in the area of the rear seat inflation portion 30 and includes the crossbar portion 36a and a vertical bar portion 36b. The crossbar portion 36a extends forward from a part of the rear edge of the shielding main body portion 24 where there is the peripheral edge portion 32 so as to divide the gas supply path portion 27 and the inflation main body portion 30b. The vertical bar portion 36b extends diagonally downward from the front end of the crossbar portion 36a toward the rear so as to divide the vertical cell 30a and the inflation main body portion 30b.

The plate-like portion 38 is disposed below the gas supply path portion 27 between the front seat inflation portion 29 and the rear seat inflation portion 30. The shape of the plate-like portion 38 is trapezoidal. In this embodiment, when the shielding main body portion 24 is woven, the plate-like portion 38 is formed so that the vehicle inside-facing wall 26a and the vehicle outside-facing wall 26b are separate from each other, except at the peripheral edge portion 32 disposed at the boundary with the inflation portion 26, as in the case of the inflation portion 26. In addition, the plate-like portion 38 is configured by cutting out one of the wall portions separated from each other over substantially the whole area, except for the peripheral edge portion 32 which is the boundary with the inflation portion 26 (see the sub-diagram inside the parentheses in FIG. 4). In this embodiment, the plate-like portion 38 is configured so that its thickness is substantially half of the thickness of the adjacent peripheral edge portion 32 (non-inflation portion 31) since the wall portion facing the inside is cut out. In addition, the plate-like portion 38 is formed by cutting off the wall portion facing the inside after the formation of the coating layer 25 when the shielding main body portion 24 is woven. That is, in the plate-like portion 38, the coating layer 25 is applied on only the outside surface of the vehicle. In the airbag 23 of this embodiment, the cutout part 67, which is formed by cutting out the inside-facing wall of the vehicle in the area of the plate-like portion 38, is used in the connection port 50 (see FIG. 10).

Figure 8:
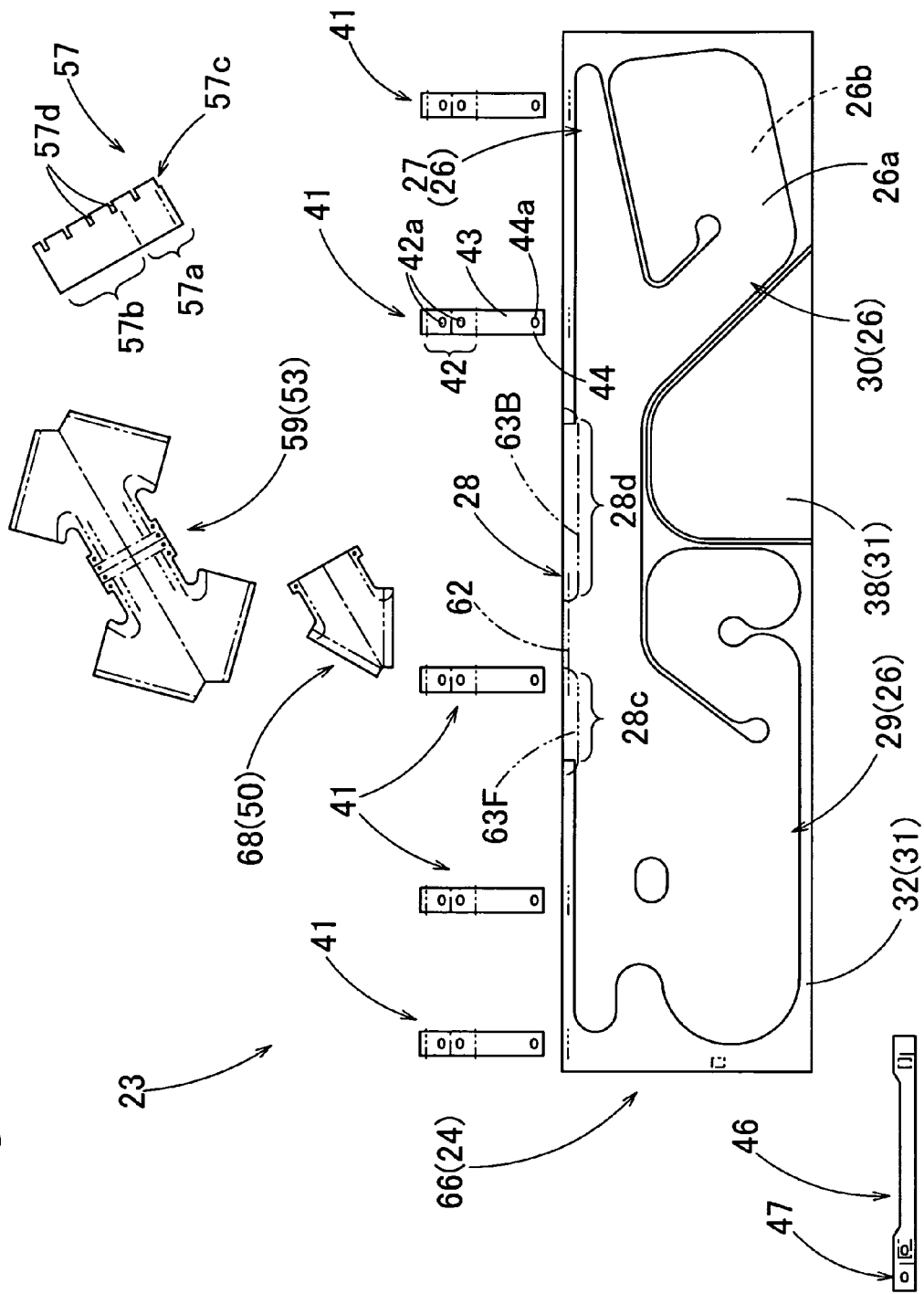
FIG. 8 is a front view showing a state in which members of the head protection airbag according to the embodiment are flatly deployed.

A plurality of the mounting portions 41 (in this embodiment, five) are disposed so as to protrude upward from the upper edge 24a of the shielding main body portion 24. In this embodiment, as shown in FIG. 8, each mounting portion 41 is formed of fabric made of polyester yarns or polyamide yarns, and is a separate body from the shielding main body portion 24. The mounting portion 41 includes a mounting main body 42 and a wrapping portion 43 which is configured to extend downward from the lower end of the mounting main body 42 and has a belt-like shape. The wrapping portion 43 is wound around the outer circumference of the folded shielding main body portion 24 in order to prevent collapsing when the airbag 23 is folded so as to be stored. A connection piece 44, which is fastened together with the mounting main body 42 by the mounting bracket 10, is formed at the other end of the wrapping portion 43. Moreover, near the center in the longitudinal direction of the wrapping portion 43, a rupture portion 43a is formed by cutting perforations lined up in the vehicle front-back direction so that the wrapping portion 43 is ruptured when the airbag 23 is deployed and inflated (see FIG. 5). In this embodiment, the rupture portion 43a is positioned below the folded shielding main body portion 24 when the airbag is installed in the vehicle. Further, in this embodiment, the mounting main body 42 has a configuration in which two sheet members overlap (see FIG. 2). The mounting main body 42 and the connection piece 44 have insertion holes 42a and 44a formed therein, through which the mounting bolt 11 can be inserted. In this embodiment, while the mounting portion 41 is partly overlapping the vehicle inside-facing wall 26a of the shielding main body portion 24, the mounting portion 41 is connected to the shielding main body portion 24 by sewing the lower end of the mounting main body 42 to the peripheral edge portion 32 at the upper edge 24a of the shielding main body portion 24 by using suture threads. Since the mounting portion 41 disposed in front of the connection port 50 is in the area of the opening 28, the shielding main body portion 24 is sewn together with the mounting portion 41 when the suture part 63F is formed (see FIG. 5).

As shown in FIG. 4, the mounting belt 46 has a belt-like shape protruding forward from near the lower end at the front edge of the shielding main body portion 24. The mounting belt 46 is formed from fabric made of polyester yarns or polyamide yarns, and is a separate body from the shielding main body portion 24. The base portion of the mounting belt 46 is sewn to the region of the peripheral edge portion 32 at the front edge of the shielding main body portion 24. The mounting belt 46 includes, at its front end, a mounting piece portion 47 which is mounted on the inner panel 2 of the body 1 by the mounting bracket 10 and the mounting bolt 11. In this embodiment, the mounting piece portion 47 is mounted and fixed to the part of the inner panel 2 near the lower end of the front pillar portion FP. The mounting belt 46 is disposed to extend substantially along the front-back direction when the inflation of the airbag 23 is completed.

Figure 7:
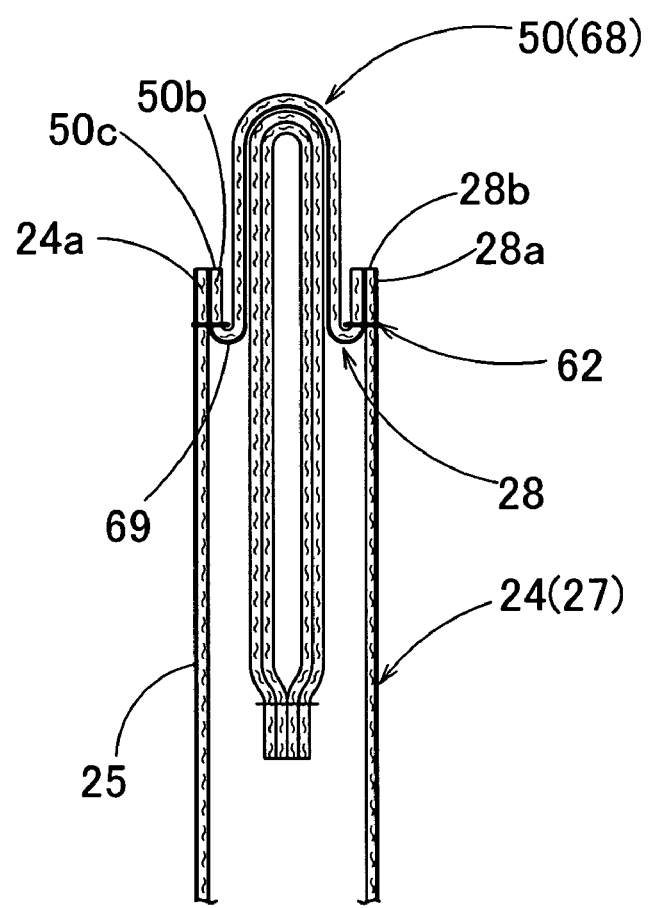
FIG. 7 is a cross-sectional view taken along the line VII-VII of FIG. 5.

As shown in FIG. 8, the connection port 50 is a separate member from the shielding main body portion 24. The connection port 50 protrudes upward from the upper edge 24a of the shielding main body portion 24, as shown in FIGS. 4 and 5. Moreover, the connection port 50 has a substantially tubular shape having openings at upper and lower opposite ends so as to allow the inflow of the inflation gas G to the inflation portion 26 of the shielding main body portion 24. Specifically, the connection port 50 has a shape in which the axial direction is inclined with respect to the vertical direction, so that the lower end 50b is further toward the front and an upper end 50a is further toward the rear. In the connection port 50, the opening at the upper end 50a serves as the insertion opening 51 for connection to the inflator 14. In the connection port 50, the opening at the lower end 50b communicates with the gas supply path portion 27 in the shielding main body portion 24. In this embodiment, the connection port 50 is disposed above the vertical cell 29b arranged near the rear end of the front seat inflation portion 29 in the shielding main body portion 24. Further, as shown in FIG. 7, by turning the lower end 50b communicating with the shielding main body portion 24 upward so that the edge portion 50c faces upward and aligning this with an edge portion 28b of the opening 28, the connection port 50 is connected to the shielding main body portion 24. Specifically, in the connection port 50, the part near the lower end 50b is sewn to a peripheral edge 28a of the opening 28. The suture part 62 where the lower end 50b of the connection port 50 is sewn to the peripheral edge 28a of the opening 28 extends in the front-back direction at a position slightly above the suture parts 63F and 63B blocking the remaining portions 28c and 28d in the opening 28 of the previously described shielding main body portion 24 (see FIG. 5).

Figure 10:
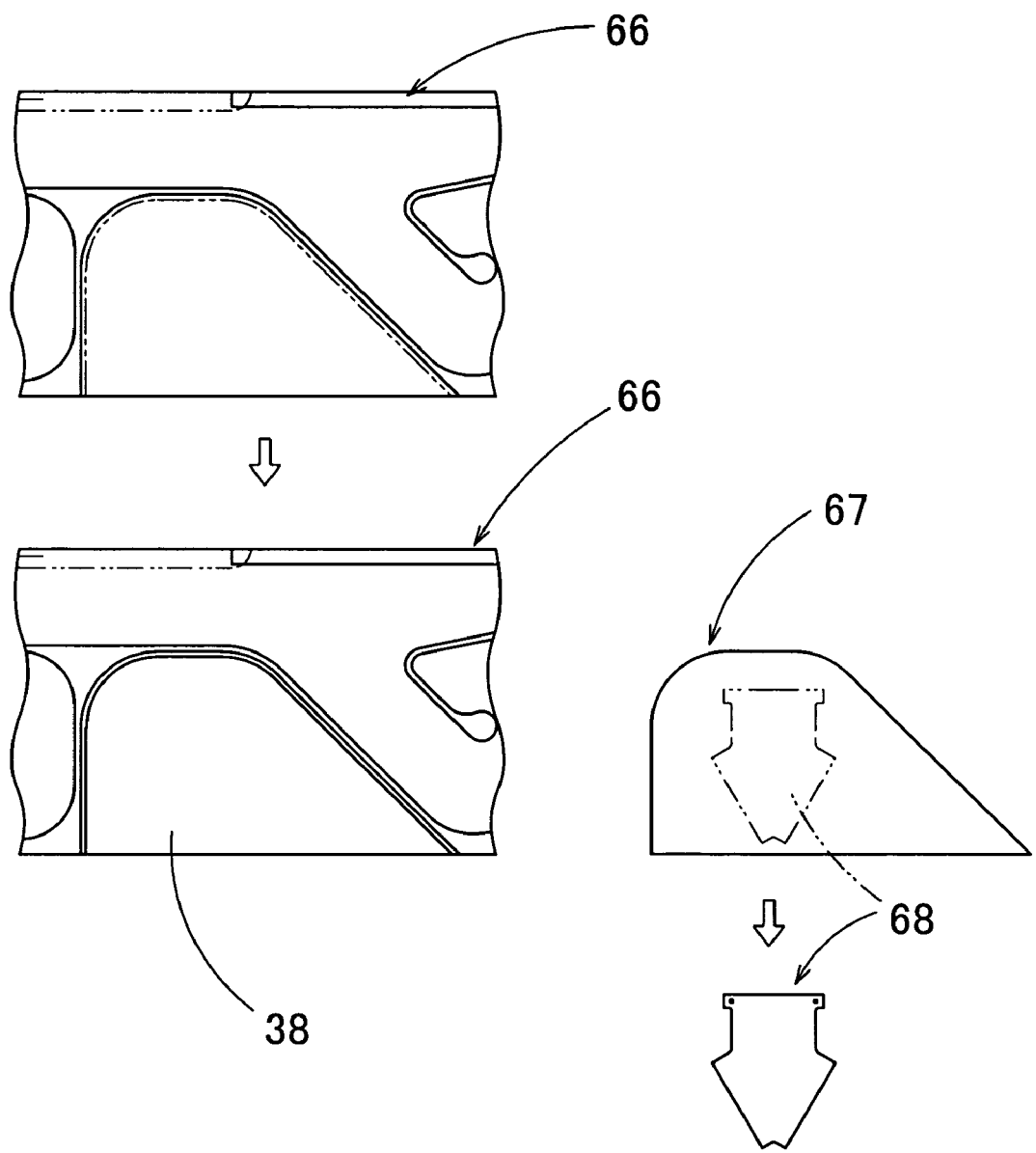
FIG. 10 is a schematic view explaining a process for forming a cutout part by cutting out a plate-like portion and for cutting out a connection port material from the cutout part in the manufacturing process of the head protection airbag according to the embodiment.
Figure 11A:
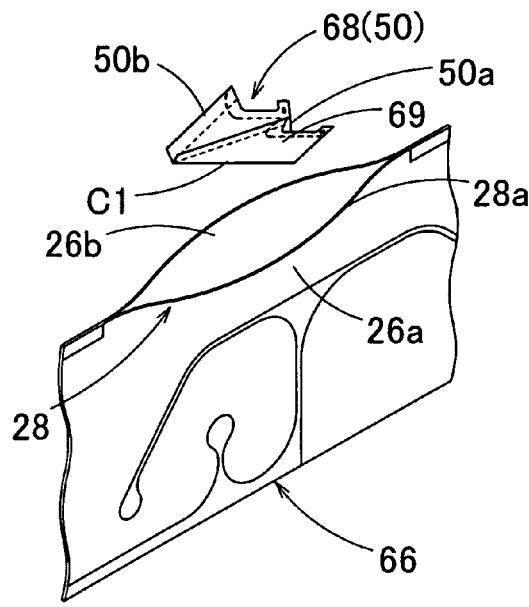
FIGS. 11A to 11D are schematic diagrams explaining a process for connecting the connection port material to a shielding main body portion material in the manufacturing process of the head protection airbag according to the embodiment.
Figure 11B:
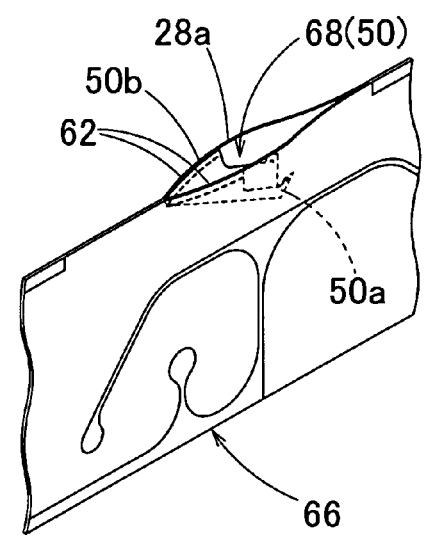
Figure 11C:
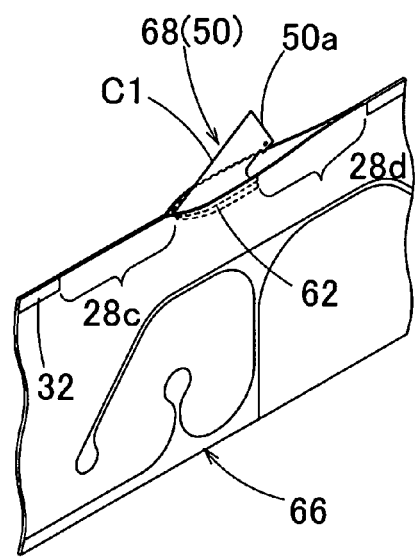
Figure 11D:
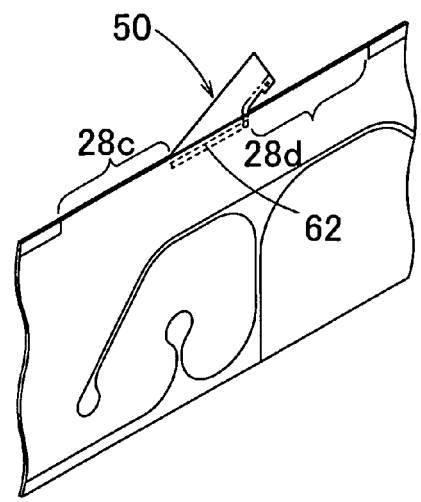

In this embodiment, the connection port 50 is formed from a connection port material 68 produced by cutting out the cutout part 67, cut out from the inside-facing wall of the vehicle in the area of the plate-like portion 38 of the shielding main body portion 24 (see FIG. 10). The connection port material 68 has a shape such that the connection port 50 is connected at its front edge. In addition, in this embodiment, the connection port 50 is made into a tubular shape by sewing together the rear edges after the connection port material 68 is folded over itself at the front edge so that the coating layer 69 is disposed on the inside (see FIGS. 5 and 7).

Figure 6:
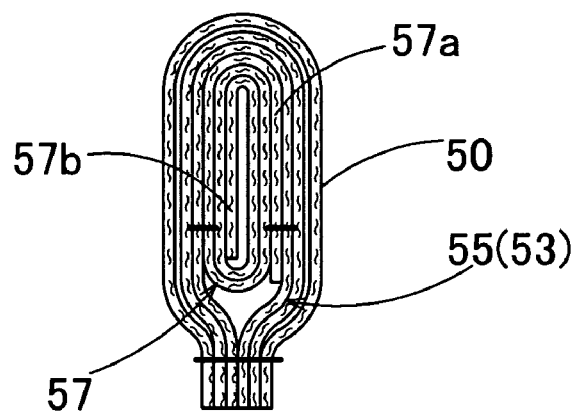
FIG. 6 is a cross-sectional view taken along the line VI-VI of FIG. 5.

In the airbag 23 of this embodiment, the inner tube 53 which protects the connection port 50 and the part near the connection port 50 in the gas supply path portion 27 is disposed in the connection port 50, as shown in FIGS. 4 to 6. The direction of the inflow of the inflation gas G which flows to the shielding main body portion 24 can be controlled by the inner tube 53. The inner tube 53 is configured to cover the whole inner side of the connection port 50 over the whole circumference, and a diffuser cloth 57 is disposed inside the inner tube 53.

The inner tube 53 is substantially tubular and is disposed so as to cover the connection port 50 and also the area below the connection port 50 in the gas supply path portion 27 (shielding main body portion 24). In this embodiment, as shown in FIGS. 4 and 5, the inner tube 53 includes an inflow side portion 55 which is inserted into the connection port 50 and an outflow side portion 56 which is disposed in the area below the connection port 50 in the gas supply path portion 27. The inflow side portion 55 has a tubular shape which is substantially the same as the shape of the connection port 50. The inflow side portion 55 is configured to have openings at upper and lower opposite ends as in the connection port 50. The outflow side portion 56 is formed so as to extend from the lower end of the inflow side portion 55 to the front and rear, with substantially cylindrically shaped openings to the front and rear. The inflation gas G discharged from the inflator 14 flows to the gas supply path portion 27 of the shielding main body portion 24 forward and backward from openings 56a and 56b respectively at the front and rear sides of the outflow side portion 56.

In this embodiment, the inner tube 53 is formed from an inner tube material 59 having a shape in which the front and upper edges are connected. From this material, the inner tube 53 is formed in the following manner. The inner tube material 59 is folded back at the upper edge to form two overlapping sheets, and is again folded into half by being folded back at the front edge, and sewing is performed at the rear and lower edges excluding the opening parts. Namely, the inner tube 53 is in a two-sheet overlapped state over its whole area. Further, in this embodiment, in the inner tube 53, the length of the inflow side portion 55 is slightly larger than the length of the connection port 50. That is, the inner tube 53 is configured so that the upper end 55a of the inflow side portion 55 protrudes from the insertion opening 51 of the connection port 50. The part protruding from the insertion opening 51 in the inflow side portion 55 is folded back so as to contact the outer side of the connection port 50 and in this configuration the inflow side portion 55 is sewn to the insertion opening 51 at upper and lower circumferential positions. The folded part constitutes a stopper 55b for keeping the connection port 50 from slipping off from the tubular holding portion 18F of the mounting bracket 17F when the airbag is installed in the vehicle (see FIGS. 3 and 5).

The diffuser cloth 57 is disposed in the inflow side portion 55 of the inner tube 53 so as to cover the outer circumference of the small diameter portion 16 at which the gas discharge port 16a of the inflator 14 is disposed. As shown in FIGS. 8 and 12, the diffuser cloth 57 has a substantially belt-like shape with a width sufficient for completely covering the small diameter portion 16 of the inflator 14. The diffuser cloth 57 is configured to be coupled to the inflow side portion 55 of the inner tube 53 at one end thereof and to have its free end wound around the outer side of the inflator 14 so as to cover the entire outer circumference of the gas discharge port 16a. Specifically, the diffuser cloth 57 is configured to be able to cover the outer circumference of the small diameter portion 16 two and a half times. In the diffuser cloth 57, one winding (one time around), serving as an outer circumferential portion 57a, which is disposed on the outermost circumferential side (on the side of the inflow side portion 55) is partially sewn to the inflow side portion 55 so that this portion cannot be shifted away from the inflow side portion 55 of the inner tube 53. The two edges of the outer circumferential portion 57a extending in both directions rotating around the axis are sewn to the inflow side portion 55 along the axial direction, except for the portion close to the upper edge (see FIG. 13B). In addition, in the diffuser cloth 57, an inner circumferential portion 57b (part at the free end), equivalent to 1.5 windings (1.5 times around), which is disposed inside the outer circumferential portion 57a, is simply wound around the small diameter portion 16 of the inflator 14 and not fixed to any adjacent member. This is in order to allow the inner circumferential portion 57b to shift with respect to the adjacent outer circumferential portion 57a and the small diameter portion 16 of the inflator 14.

The upper end part 57c of the diffuser cloth 57 is not folded back together with the inner tube 53. That is, the upper end part 57c of the diffuser cloth 57 protrudes upward from the insertion opening 51 at the upper end 50a of the connection port 50 (see FIG. 5). A plurality of slits 57d in the axial direction are formed over the whole upper end part 57c of the diffuser cloth 57 (see FIG. 8). The slits 57d are formed to divide the upper edge (upper end part 57c) of the diffuser cloth 57 into plural pieces along the circumference around the axis of the inflator 14. In this embodiment, the slits 57d are formed for each half pitch. In this embodiment, the inner tube material 59 and the diffuser cloth 57 constituting the inner tube 53 are formed from coated cloth in which a coating agent including silicon and the like is applied on the surface of fabric which is made of polyester yarns or polyamide yarns. In this embodiment, the inner tube 53 is manufactured by folding the inner tube material 59 in half, so that the coating surface (coating layer) is on the outer side. The diffuser cloth 57 is configured so that the coated surface (coating layer) is disposed on the inner side toward the inflator 14.

Figure 9:
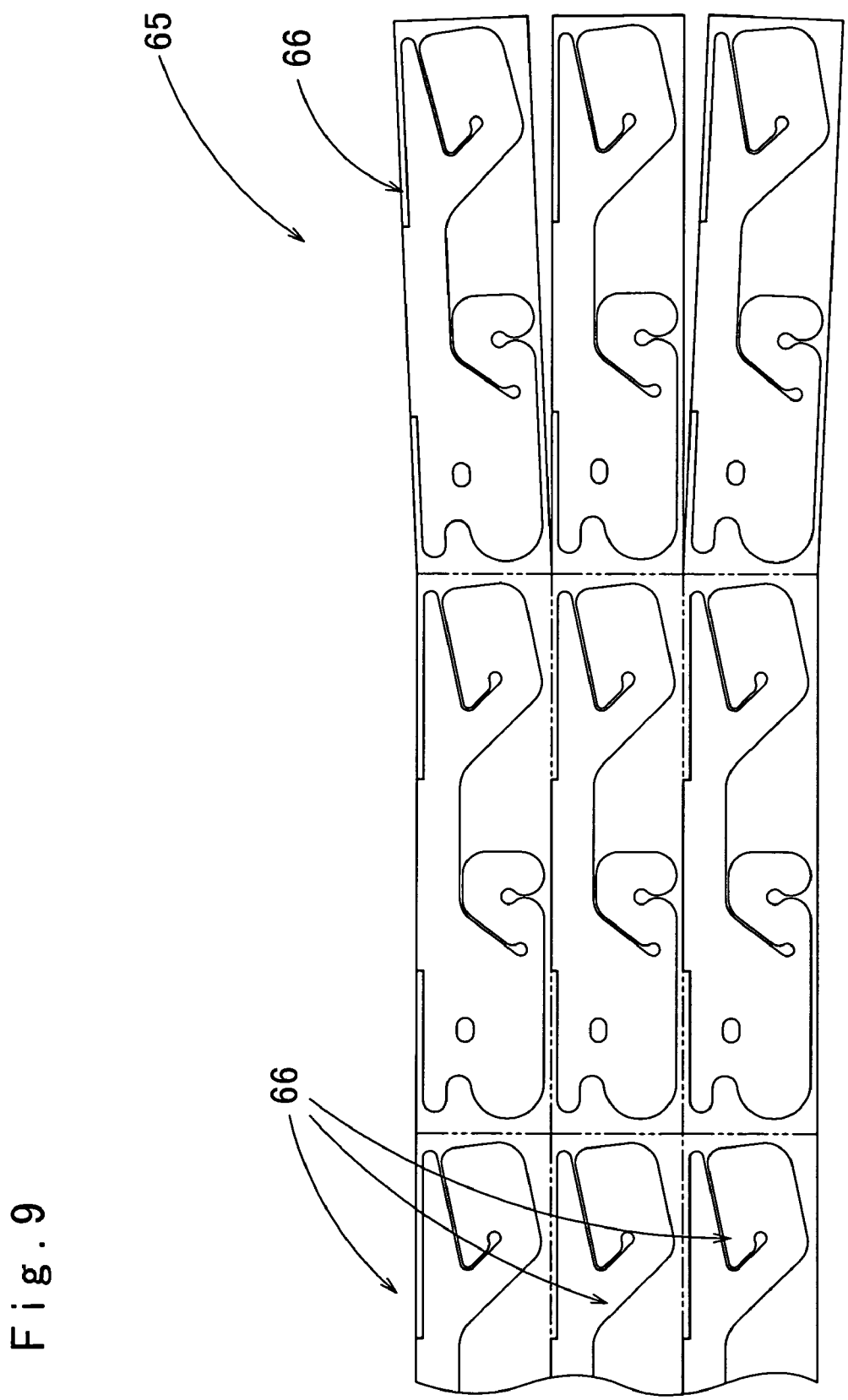
FIG. 9 is a front view showing an airbag base material in a manufacturing process of the head protection airbag according to the embodiment.

Next, the manufacturing of the airbag 23 of this embodiment will be described. First, the coating layer 25 is formed by applying a coating agent to the outer surface of the airbag material 65, which is woven so that the shielding main body portion materials 66 are continuously provided in a row and a plurality of these rows (in this embodiment, three) are provided side by side, as shown in FIG. 9. Next, the airbag material 65 is cut into individual shielding main body portion materials 66. After that, the cutout part 67 is obtained by cutting out the inside-facing wall of the vehicle in the region of the plate-like portion 38 of the shielding main body portion material 66, as shown in FIG. 10. Next, the connection port material 68 is cut out from the cutout part 67. Further, the inner tube material 59 constituting the inner tube 53 is folded in half and the diffuser cloth 57 is sewn thereto in advance (see FIGS. 12A and 12B).

Figure 12A:
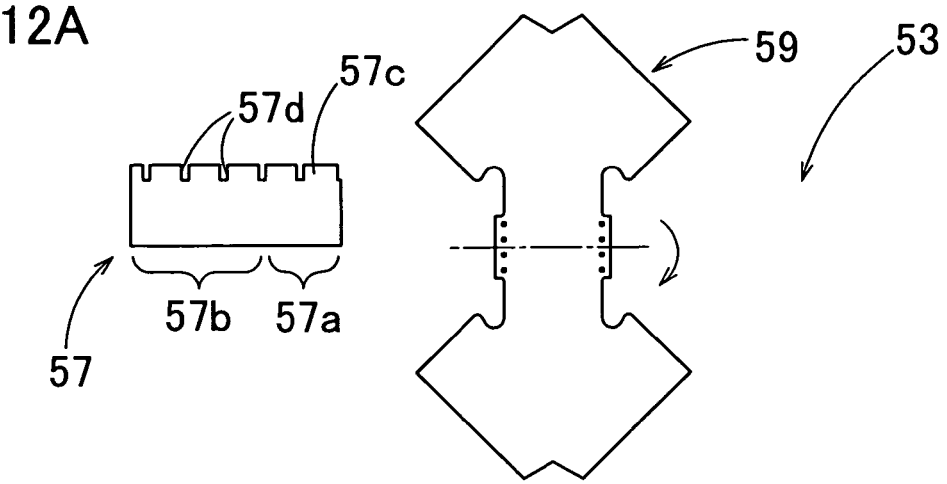
FIGS. 12A to 12D are schematic diagrams explaining a process for manufacturing an inner tube in the manufacturing process of the head protection airbag according to the embodiment.
Figure 12B:
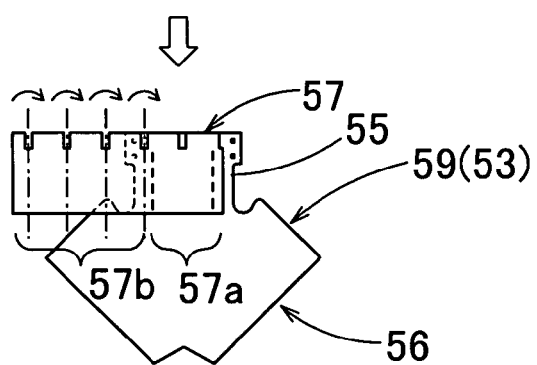
Figure 12C:
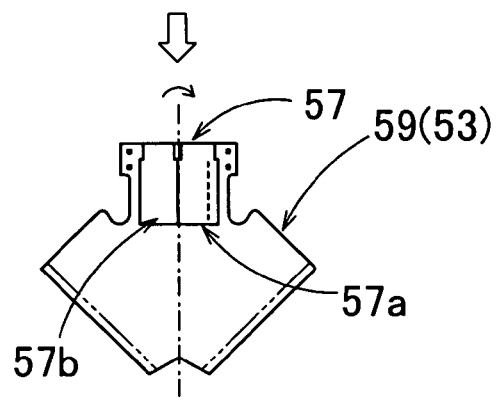
Figure 12D:
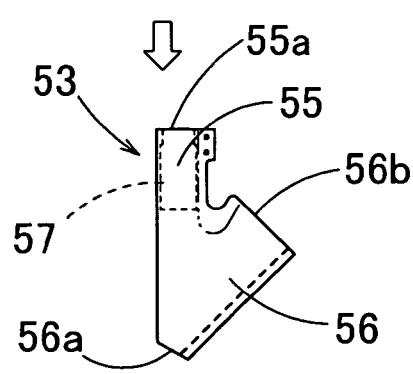
Figure 13A:
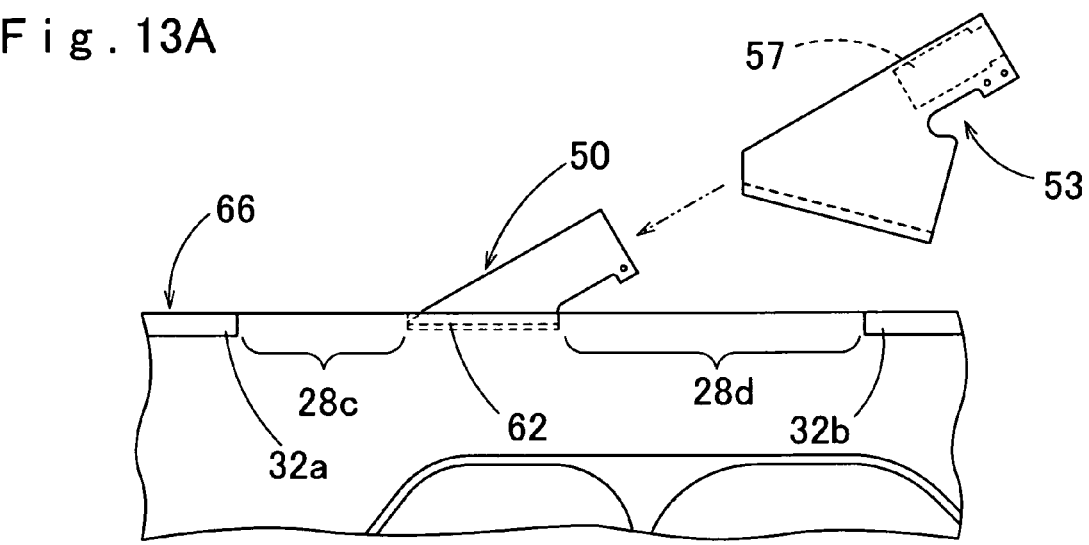
FIGS. 13A to 13C are schematic diagrams explaining a process for forming the connection port and the inner tube by inserting the inner tube into the connection port in the manufacturing process of the head protection airbag according to the embodiment.
Figure 13B:
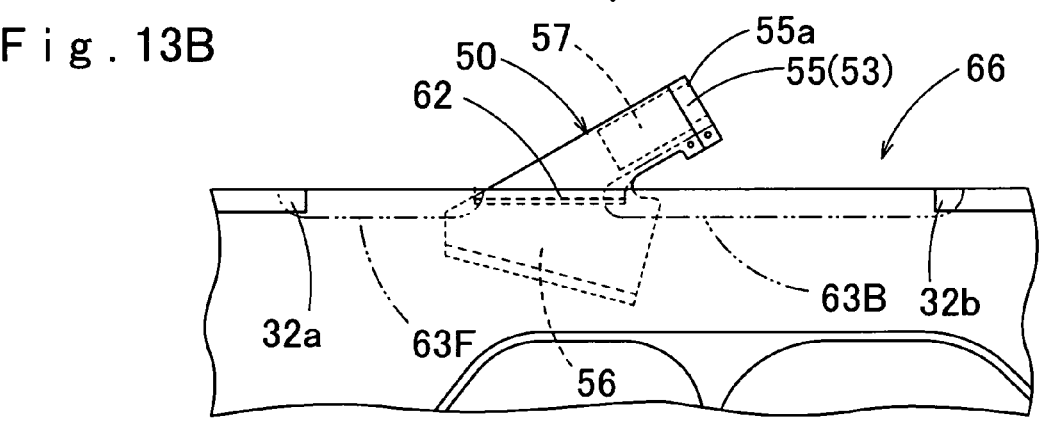

Then, the connection port material 68 is reversed so that the insertion opening 51 is positioned on the lower side. Specifically, the connection port material 68 is folded at a folding line C1 at the front edge so that the coating layer 69 is positioned on the outer side, and is thus reversed so that the insertion opening 51 (upper end 50a) is positioned downward and the lower end 50b is positioned upward (see FIG. 11A). The reversed connection port material 68 is inserted into the shielding main body portion material 66 (shielding main body portion 24) at the opening 28. The connection port material 68 is disposed so that its edge portion 50c is matched with the edge portion 28b of the opening 28, and the part near the lower end 50b is sewn to the peripheral edge 28a of the opening 28 with suture threads. Thus, the suture part 62 is formed (see FIG. 11B). After that, the connection port material 68 is folded back at a line near the suture part 62 to restore it from its reversed state (see FIGS. 11C and 11D). At this time, the connection port material 68 is re-folded at the folding line C1 so that the coating layer 69 is positioned on the inner side of the port. As shown in FIGS. 12B and 12C, the diffuser cloth 57 is roll-folded from the longitudinal edge of the inner winding portion 57b. The inner tube material 59 constituting the inner tube 53 is folded with the diffuser cloth 57 interposed (see FIGS. 12C and 12D). While the folded state of the inner tube material 59 is maintained, the inner tube 53 is inserted into the remaining portion 28d of the opening 28 and is interposed between the folded sides of the connection port material 68 (see FIGS. 13A and 13B).

Figure 13C:
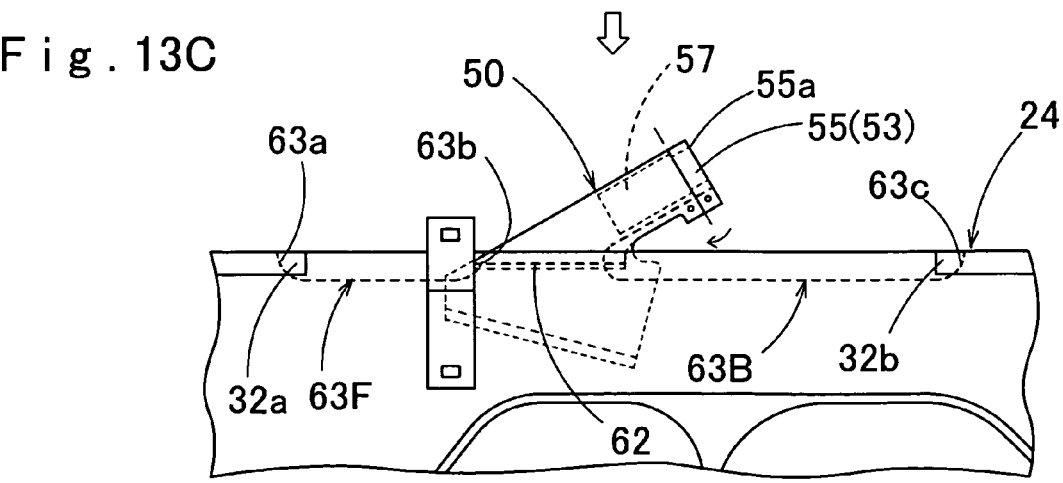

Then, the remaining portion 28c of the opening 28 is sewn up so as to form the suture part 63F. The remaining portion 28d of the opening 28 is sewn up, and in the same operation, the rear edge of the connection port material 68 and the rear edge of the inner tube 53 are sewn together. In this manner, the suture part 63B connects the upper edge of the gas supply path portion 27 and the rear edge of the connection port 50, and the connection port 50 and the inner tube 53 are thus formed (see FIG. 13C). Next, as shown in FIGS. 14A and 14B, the part of the inner tube 53 at the upper end 55a of the inflow side portion 55 protruding from the insertion opening 51 of the connection port 50 is folded back so as to be disposed on the outer circumference of the connection port 50. In addition, the stopper 55b is formed by sewing this folded-back part in the parts to the upper and lower edges of the connection port 50. Next, if the mounting portions 41 and the mounting belt 46 are sewn to predetermined positions in the shielding main body portion 24, the airbag 23 can be manufactured.

Next, the installation of the airbag device M of this embodiment in the vehicle V will be described. First, the airbag 23 is folded. Specifically, in a state in which the vehicle inside-facing wall 26a and the vehicle outside-facing wall 26b overlap with each other so as to be flatly deployed, the area of the gas supply path portion 27 in the shielding main body portion 24 is folded in the same manner as a bellows, with folding lines in the front-back direction, and the area below the gas supply path portion 27 is roll-folded so that the lower edge 24b winds toward the outside of the vehicle. In this manner, the shielding main body portion 24 is folded. When the folding of the shielding main body portion 24 is completed, the wrapping portions 43 of the mounting portions 41 are wound around the folded shielding main body portion 24. In addition, the connection piece 44 formed at the tip end of the wrapping portion 43 is disposed so as to overlap against the outside of the mounting main body 42. The mounting bracket 10 is mounted on the mounting portion 41 (mounting main body 42 and connection piece 44) so as to sandwich the connection piece 44 and the mounting main body 42. Also, the mounting bracket 10 is mounted on the mounting piece portion 47 formed at the tip end of the mounting belt 46. The inflator 14 is inserted into the connection port 50 by inserting its small diameter portion 16 within the annular diffuser cloth 57 of the inner tube 53. The tubular holding portion 18F of the mounting bracket 17F toward the front is exteriorly mounted around the connection port 50. The tubular holding portion 18B of the mounting bracket 17B toward the rear is exteriorly mounted around the main body 15 of the inflator 14. By thus mounting the mounting brackets 17F and 17B around the inflator 14, an airbag assembly is formed.

Then, the mounting brackets 10 and 17 are mounted and fixed at predetermined positions in the inner panel 2 using the mounting bolts 11 and 20, and in this manner, the airbag assembly is mounted on the body 1. Next, a lead line (not shown) extending from a predetermined controller for operating the inflator is connected to the inflator 14. The front pillar garnish 4 and the roof head lining 5 are mounted on the body 1. If the rear pillar garnish 6 and the center pillar garnish 7 are mounted on the body 1, the airbag device M can be installed in the vehicle V.

When the inflator 14 is operated after the installation of the airbag device M in the vehicle V, the inflation gas G from the inflator 14 flows to the shielding main body portion 24 of the airbag 23, as shown by the two-dot chain line of FIG. 4. In addition, the shielding main body portion 24 of the airbag 23 ruptures the rupture portion 43a of the wrapping portion 43 and pushes open the airbag cover 8 formed of the lower edges of the front pillar garnish 4 and the roof head lining 5 so that the airbag cover 8 protrudes downward. After that, the airbag 23 greatly inflates so as to cover the windows W1 and W2 on the inside, the center pillar portion CP, and the rear pillar portion RP, as shown by the two-dot chain line of FIG. 1.

In the airbag 23 according to the embodiments, only the shielding main body portion 24, which has a substantially rectangular plate shape when flatly deployed with vehicle inside-facing wall 26a and the vehicle outside-facing wall 26b overlapping, is formed by double weaving, and the mounting portions 41 and the connection port 50 which are formed to protrude upward from the upper edge 24a of the shielding main body portion 24 are formed separately from the shielding main body portion 24. That is, in the airbag 23 according to the embodiments, the substantially rectangular shielding main body portion 24 with no partial protruding part is formed independently by cutting the airbag material 65 which originally is a long sheet member. Accordingly, when the airbag 23 is manufactured, the amount of remaining airbag material 65 after the manufacture can be reduced, and the yield of the airbag material 65 can be enhanced.

Thus, regarding the airbag 23 according to the embodiments, the yield is enhanced and the manufacturing is thus performed at a low cost.

In the airbag 23 according to the embodiments, the connection port 50 is formed of a cloth material separate from the shielding main body portion 24. Accordingly, when coated cloth having the coating layer 69 on one side thereof is used as the connection port material 68, the connection port 50 can be formed so that the coating layer 69 is disposed on the inner side of the port. In the case of airbags in which the connection port and the shielding main body portion are integrally double-woven as in the past, the coating layer is formed on only the outer surface of the airbags. However, since the high-temperature inflation gas discharged from the inflator flows inside the connection port, in view of the need for heat resistance, durability and the like, it is preferable that the coating layer is disposed on the inner side of the port which contacts with the inflation gas. In the airbag 23 according to the embodiments, the connection port 50 is formed so that the coating layer 69 is disposed on the inner side of the port, and thus the heat resistance and the durability of the connection port 50 can be improved in comparison with conventional airbags.

In the airbag 23 according to the embodiment, the opening 28 for connecting the connection port 50 is formed at the upper edge 24a of the shielding main body portion 24. The connection port 50 is connected to the shielding main body portion 24 by reversing the edge portion 50c at the lower end 50b communicating with the shielding main body portion 24, turning it upward and sewing it to the peripheral edge 28a of the opening 28. That is, in the airbag 23 according to the embodiment, when the connection port 50 (connection port material 68) is turned inside out, its edge portion 50c at its lower end 50b is turned upward and aligned with the edge portion 28b of the opening 28, the edge portion 50c is sewn to the peripheral edge 28a of the opening 28, and the connection port 50 is turned back out to its original state, the edge portion 50c at the lower end 50b of the connection port 50 can be connected to the shielding main body portion 24 (see FIG. 11). Accordingly, the operation of sewing the edge portion 50c at the lower end 50b of the connection port 50 to the peripheral edge 28a of the opening 28 is easily performed and the number of manufacturing processes for the airbag 23 can be reduced. If this advantage is not considered important, the lower end side of the connection port need not be reversed so as to turn the edge portion upward and thus be sewn to the peripheral edge of the opening. The airbag may have a configuration in which, without the reversion, the lower end side of the connection port is brought into contact with the peripheral edge of the opening in a state in which the edge portion is turned downward, and the edge portion is coupled to the peripheral edge of the opening by using an adhesive, suture threads or the like.

In the embodiments, the shielding main body portion material 66 can be manufactured by cutting the airbag material 65 in straight lines. Accordingly, the airbag material 65 can be cut with an enhanced yield. In addition, in the airbag 23 according to the embodiments, the airbag having a shape with a partial protrusion need not be cut from the airbag material as with the conventional head protection airbags in which the connection port is integrally disposed, and the shielding main body portion material 66 can be manufactured with a straight line cutting operation. Thus, laser cutting is not required, and the cutting can thus be performed by a cold cutter. As a result, initial manufacturing costs can be reduced and the number of manufacturing processes can also be reduced.

In the airbag 23 according to the embodiments, the connection port material 68 constituting the connection port is formed from the cutout part 67 cut out from the inside-facing wall of the plate-like portion 38 which is the non-inflation portion 31 in the shielding main body portion 24. Accordingly, when the shielding main body portion 24 is manufactured, a separate connection port material 68 can be concurrently manufactured. As a result, manufacturing cost can be reduced in comparison with the case in which the connection port material is formed from a separate base material.

In the airbag 23 according to the embodiments, the region of the plate-like portion 38 is woven so that the vehicle inside-facing wall 26a and the vehicle outside-facing wall 26b are separate from each other, and only the inside-facing wall of the vehicle is cut out in order to be used as the connection port 50. However, the shape of the plate-like portion and the member which is formed from the cut-out plate-like portion are not limited to these. For example, the region of the plate-like portion may be allowed to have a single sheet-like shape in which the vehicle inside-facing wall and the vehicle outside-facing wall are coupled to each other as in another non-inflation portion and this region may be cut out to be used as the connection port. In addition, a configuration may be employed in which the plate-like portion is woven so that the vehicle inside-facing wall and the vehicle outside-facing wall are separate from each other as in the embodiments, and the connection port, the inner tube and the mounting portions and the like are all cut out from the two wall portions.

Figure 15:
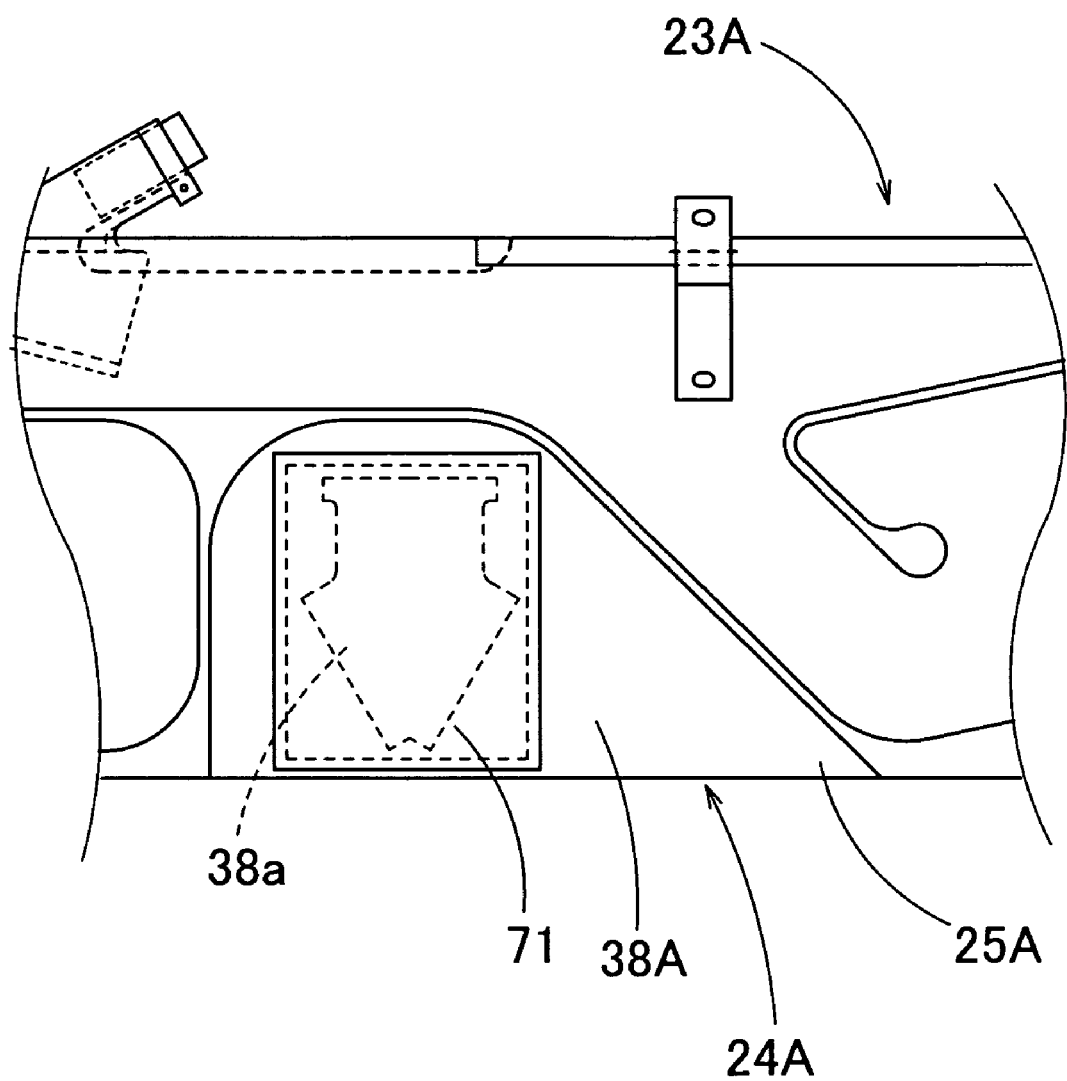
FIG. 15 is a partial enlarged front view showing the vicinity of a plate-like portion in a head protection airbag according to another embodiment of the invention.

As an example, FIG. 15 shows an airbag 23A, in which a region of a plate-like portion 38A having a single sheet structure in which a vehicle inside-facing wall and a vehicle outside-facing wall are coupled to each other as in other non-inflation portions is cut out to be used as a connection port. As in the airbag 23A, when an opening 38a is formed by cutting out connection port material in the plate-like portion 38A, the opening 38a can be blocked by a separate blocking member 71. In the airbag 23A having such a configuration, when the inflation of the airbag 23A is completed, the windows can be completely covered on the inside even in the region of a non-inflation portion (area of plate-like portion 38A) which is not a protection area for protecting the head of a vehicle occupant. Accordingly, even if the head of the vehicle occupant hits the area of the plate-like portion 38A, it is possible to prevent the head of the vehicle occupant from being brought into contact with the windows. In this case, the blocking member 71 can be formed of uncoated cloth. When the blocking member 71 is formed from uncoated cloth, the manufacturing cost of the airbag 23A, in which a coating layer 25A is formed on the whole outer surface, can be further reduced and the weight of the airbag itself can be reduced.

In the embodiments, the wrapping portion 43 to prevent collapsing when the airbag 23 is folded so as to be stored is configured integrally with the mounting portion 41. While being wound around the folded shielding main body portion 24, the wrapping portion 43 prevents the collapsing of the folded shielding main body portion 24 when the connection piece 44 provided at the tip end is fastened to the mounting main body 42 using the mounting bracket 10 for mounting the mounting main body 42 on the upper edge of the window W1 or W2. Accordingly, when the mounting bracket 10 is mounted on the mounting main body 42, the wrapping portion 43 for preventing collapsing of the airbag 23 can be concurrently disposed around the airbag 23. As a result, because separate wrapping members are not required, it is possible to reduce the number of manufacturing processes and costs.

In the embodiments, the rupture portion 43a which is provided in the wrapping portion 43 and ruptured when the airbag 23 is deployed and inflated is positioned below the folded shielding main body portion 24. Accordingly, when the airbag 23 begins to inflate and the folded shielding main body portion 24 protrudes downward so as become unfolded, the rupture portion 43a can be rapidly ruptured and the airbag 23 can thus be rapidly deployed.

In the airbag 23 according to the embodiments, in the connection port 50, the inner tube 53 is disposed so as to cover both the connection port 50 and the area below the connection port 50 in the gas supply path portion 27. Accordingly, it is possible to protect the connection port 50 and the parts of the shielding main body portion 24 near the connection port 50 (area below the connection port 50 in the gas supply path portion 27), and to further improve the heat resistance and the durability of the connection port 50. In the embodiments, the rear edge of the inner tube material 59 constituting the inner tube 53 and the rear edge of the connection port material 68 constituting the connection port 50 are sewn together. That is, in the embodiments, when the connection port 50 is sewn together, the inner tube 53 is concurrently sewn together at the rear edge thereof so as to be connected to the connection port 50. Thus, in comparison with the case in which the inner tube is inserted into the pre-manufactured connection port, the manufacturing operation is easily performed and it is possible to reduce the manufacturing costs and the number of manufacturing processes.

Figure 16:
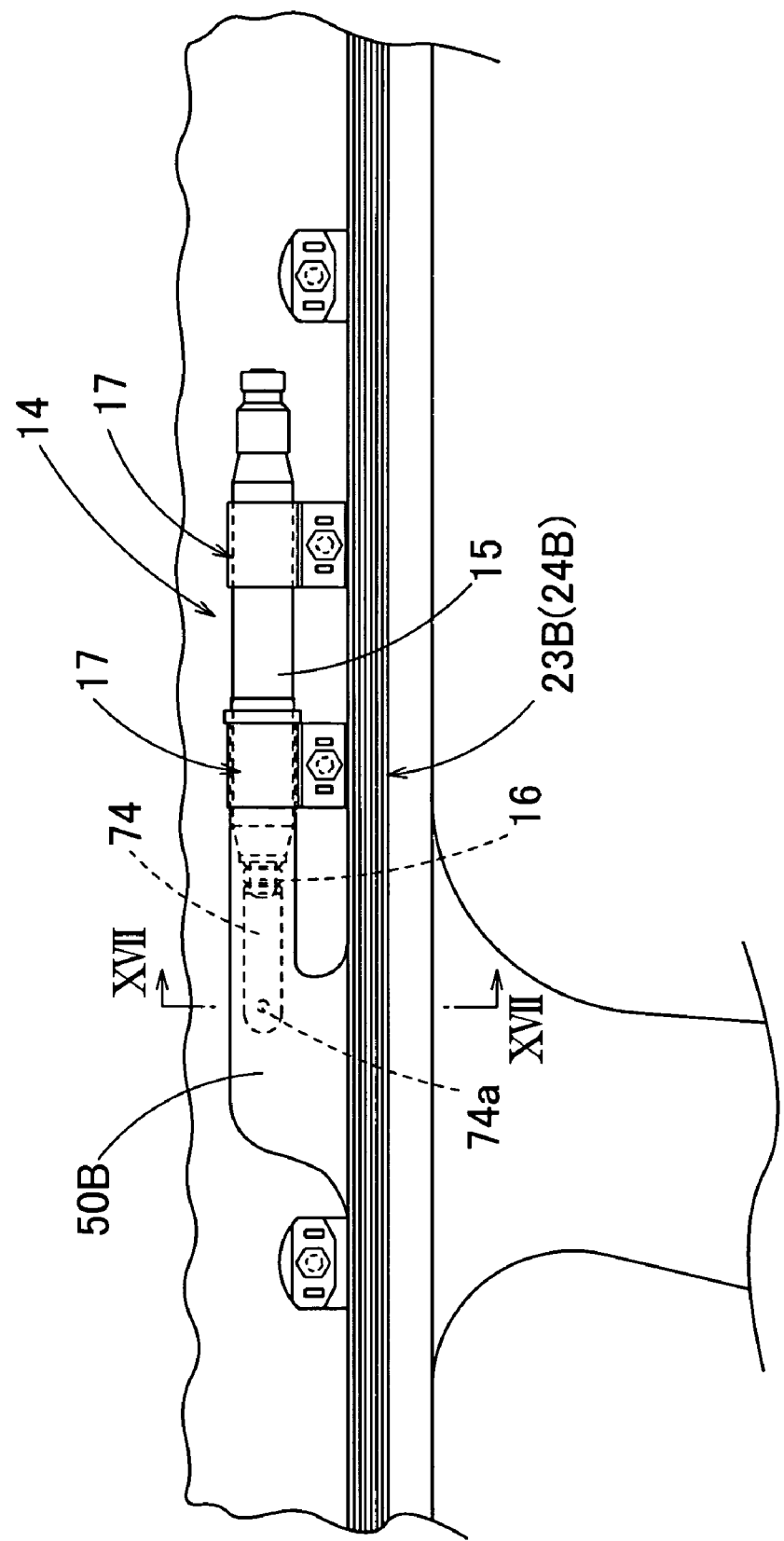
FIG. 16 is a partial enlarged front view showing the vicinity above a center pillar portion in a head protection airbag device using a head protection airbag according to further another embodiment of the invention, in which a roof head lining is omitted.
Figure 17:
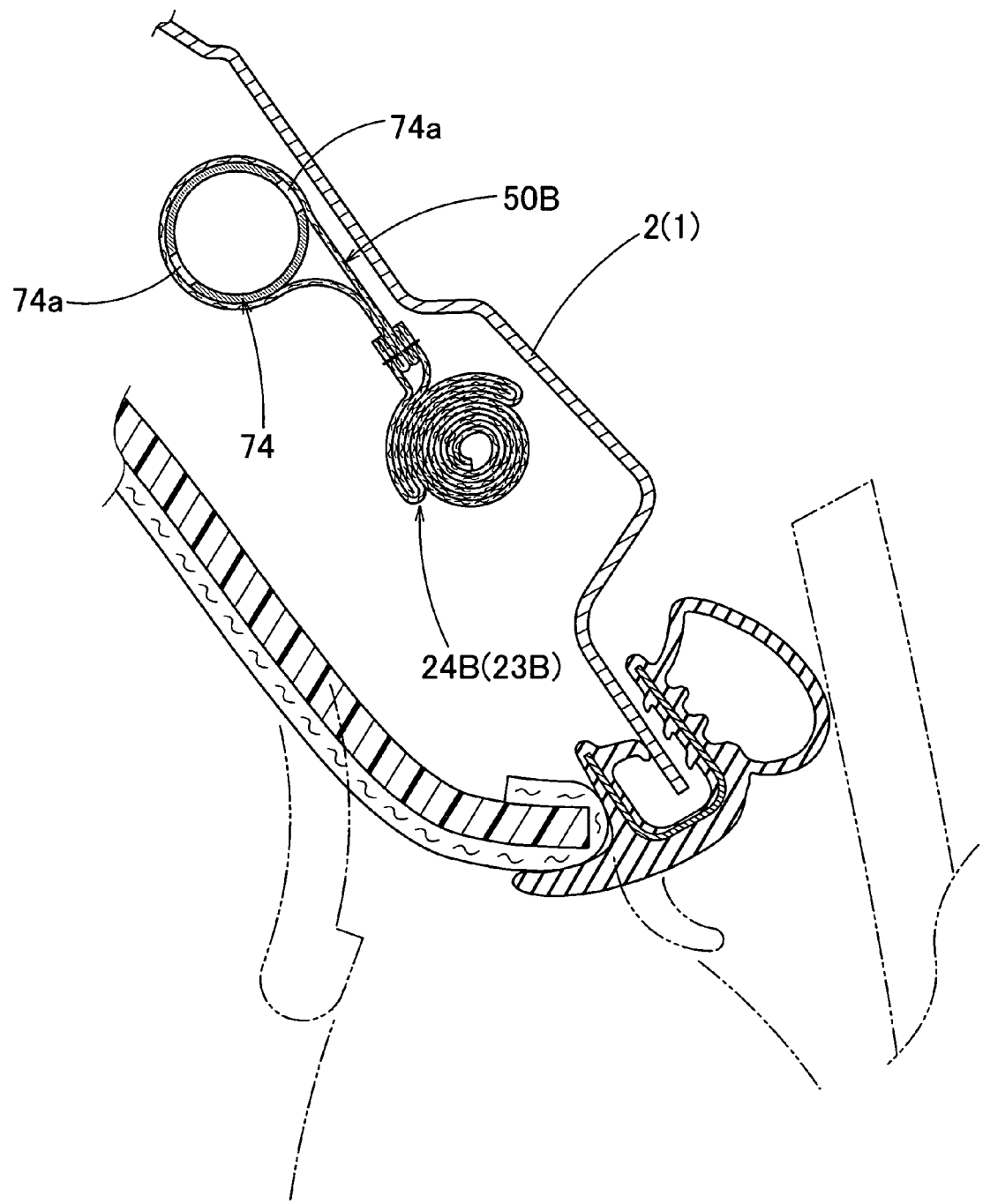
FIG. 17 is a cross-sectional view taken along the line XVII-XVII of FIG. 16.

In the embodiments, the inner tube 53 made of cloth and the diffuser cloth 57 are disposed in the connection port 50. However, the airbag 23B may have a configuration in which a diffuser 74 covering and extending beyond the small diameter portion 16 is connected to an inflator 14, and no inner tube is disposed in the connection port 50B, as shown in FIGS. 16 and 17. The diffuser 74 is connected to the inflator 14 by crimping its base portion to the end of the main body 15 of the inflator 14 (at the small diameter portion 16). In addition, the end of the diffuser 74, whose axis is in the front-back direction, is blocked. Near the tip end of the diffuser 74, gas ejection holes 74a for ejecting an inflation gas to the airbag 23B (shielding main body portion 24B) are formed at two positions symmetrical to each other with respect to the axial center of the diffuser 74. In the drawing, the gas ejection holes 74a are formed at two positions symmetrical to each other, in the vehicle-inward and outward directions (see FIG. 17).

What is claimed is:

1. A head protection airbag which is configured to be folded and stored by an upper edge of a window on an inside of a vehicle, an upper edge side of the airbag being mounted and fixed to a body of the vehicle, so as to protrude downward from where the head protection airbag is stored due to an inflow of inflation gas from an inflator, and to be deployed and inflated so as to cover the window on the inside, the head protection airbag comprising:

a shielding main body portion which is configured to cover the window on the inside when the inflation is completed;

a plurality of mounting portions which protrude upward from an upper edge of the shielding main body portion and mount the upper edge of the shielding main body portion on the upper edge of the window; and a connection port which has a substantially tubular shape, protrudes upward from the upper edge of the shielding main body portion, and has an insertion opening for connection to the inflator at an upper end, so as to allow the inflow of inflation gas to an inflation portion of the shielding main body portion, wherein the shielding main body portion has an inflation portion, which is inflated due to the inflow of inflation gas between a vehicle inside-facing wall and a vehicle outside-facing wall, and a non-inflation portion into which there is no inflow of inflation gas, is manufactured by double weaving, and has a shape when the shielding main body portion is flatly deployed so that the vehicle inside-facing wall and the vehicle outside-facing wall overlap with each other which is substantially rectangular, wherein the mounting portions and the connection port are separate from the double-woven shielding main body portion and are connected to the shielding main body portion, wherein an opening for connecting the connection port is formed at the upper edge of the shielding main body portion, and wherein the connection port is connected to the shielding main body portion by reversing a lower edge of the connection port which is to communicate with the shielding main body portion so that the lower edge is turned upward, and sewing the lower edge to a peripheral edge of the opening formed at the upper edge of the shielding main body portion for connecting the connection port.

2. The head protection airbag according to claim 1,
wherein a connection port material constituting the connection port is formed from coated cloth having a coating layer on one side thereof, and the connection port is formed so that the coating layer is disposed on an inner side of the connection port.

3. The head protection airbag according to claim 1,
wherein a connection port material constituting the connection port is formed by being cut out from the non-inflation portion in the shielding main body portion.

4. The head protection airbag according to claim 3,
wherein an outer surface of the shielding main body portion is covered with a coating layer which is formed by applying a coating agent for preventing gas leakage, and
wherein the connection port material is formed into the connection port so that the coating layer is disposed on an inner side of the connection port.

5. The head protection airbag according to claim 3,
wherein in the non-inflation portion, an opening which is formed by cutting out the connection port material is blocked by a separate blocking member.

6. The head protection airbag according to claim 1,
wherein each of the plurality of mounting portions is configured to include a mounting main body and a belt-shaped wrapping portion extending downward from a lower end of the mounting main body, and the lower end of the mounting main body is coupled to the upper edge of the shielding main body portion, and
wherein the wrapping portion is configured to include a connection piece, which is disposed at an end separate from the mounting main body and is fastened together with the mounting main body with a mounting bracket for mounting the mounting main body on the upper edge of the window, and a rupture portion, which can be ruptured when the airbag is deployed and inflated, and is wound around the folded shielding main body portion so as to prevent collapsing when the airbag is folded so as to be stored.

7. The head protection airbag according to claim 6,
wherein when the airbag is installed in a vehicle, the rupture portion is positioned below the folded shielding main body portion.

8. The head protection airbag according to claim 1,
wherein an inner tube is disposed in the connection port so as to cover both the connection port and an area below the connection port in the shielding main body portion.

9. A head protection airbag which is configured to be folded and stored by an upper edge of a window on an inside of a vehicle, an upper edge side of the airbag being mounted and fixed to a body of the vehicle, so as to protrude downward from where the head protection airbag is stored due to an inflow of inflation gas from an inflator, and to be deployed and inflated so as to cover the window on the inside, the head protection airbag comprising:

a shielding main body portion which is configured to cover the window on the inside when the inflation is completed;

a plurality of mounting portions which protrude upward from an upper edge of the shielding main body portion and mount the upper edge of the shielding main body portion on the upper edge of the window; and a connection port which has a substantially tubular shape, protrudes upward from the upper edge of the shielding main body portion, and has an insertion opening for connection to the inflator at an upper end, so as to allow the inflow of inflation gas to an inflation portion of the shielding main body portion, wherein the shielding main body portion has an inflation portion, which is inflated due to the inflow of inflation gas between a vehicle inside-facing wall and a vehicle outside-facing wall, and a non-inflation portion into which there is no inflow of inflation gas, is manufactured by double weaving, and has a shape when the shielding main body portion is flatly deployed so that the vehicle inside-facing wall and the vehicle outside-facing wall overlap with each other which is substantially rectangular, and wherein the mounting portions and the connection port are separate from the double-woven shielding main body portion and are connected to the shielding main body portion, wherein a connection port opening for connecting the connection port is formed at the upper edge of the shielding main body portion, the connection port is connected to the shielding main body portion by sewing a lower edge of the connection port to a peripheral edge of the connection port opening, the connection port opening is formed with an opening width dimension in a front-back direction is larger than the width dimension in a front-back direction of a lower end of the connection port, and remaining portions of the connection port opening in which the connection port is sewed are blocked by sewing the vehicle inside-facing wall and the vehicle outside-facing wall which overlap with each other.

10. The head protection airbag according to claim 9,
wherein a connection port material constituting the connection port is formed from coated cloth having a coating layer on one side thereof, and the connection port is formed so that the coating layer is disposed on an inner side of the connection port.

11. The head protection airbag according to claim 9,
wherein a connection port material constituting the connection port is formed by being cut out from the non-inflation portion in the shielding main body portion.

12. The head protection airbag according to claim 11,
wherein an outer surface of the shielding main body portion is covered with a coating layer which is formed by applying a coating agent for preventing gas leakage, and
wherein the connection port material is formed into the connection port so that the coating layer is disposed on an inner side of the connection port.

13. The head protection airbag according to claim 11,
wherein in the non-inflation portion, an opening which is formed by cutting out the connection port material is blocked by a separate blocking member.

14. The head protection airbag according to claim 9,
wherein each of the plurality of mounting portions is configured to include a mounting main body and a belt-shaped wrapping portion extending downward from a lower end of the mounting main body, and the lower end of the mounting main body is coupled to the upper edge of the shielding main body portion, and wherein the wrapping portion is configured to include a connection piece, which is disposed at an end separate from the mounting main body and is fastened together with the mounting main body with a mounting bracket for mounting the mounting main body on the upper edge of the window, and a rupture portion, which can be ruptured when the airbag is deployed and inflated, and is wound around the folded shielding main body portion so as to prevent collapsing when the airbag is folded so as to be stored.

15. The head protection airbag according to claim 14,
wherein when the airbag is installed in a vehicle, the rupture portion is positioned below the folded shielding main body portion.

16. The head protection airbag according to claim 9,
wherein an inner tube is disposed in the connection port so as to cover both the connection port and an area below the connection port in the shielding main body portion.

* * * * *